United States Patent
Wang

(10) Patent No.: US 11,849,134 B2
(45) Date of Patent: Dec. 19, 2023

(54) SIGNALING OF DPB PARAMETERS FOR MULTI-LAYER VIDEO BITSTREAMS

(71) Applicant: Huawei Technologies Co., Ltd., Shenzhen (CN)

(72) Inventor: Ye-Kui Wang, San Diego, CA (US)

(73) Assignee: Huawei Technologies Co., Ltd., Shenzhen (CN)

(*) Notice: Subject to any disclaimer, the term of this patent is extended or adjusted under 35 U.S.C. 154(b) by 7 days.

(21) Appl. No.: 17/700,813

(22) Filed: Mar. 22, 2022

(65) Prior Publication Data
US 2022/0217385 A1    Jul. 7, 2022

Related U.S. Application Data

(63) Continuation of application No. PCT/US2020/051279, filed on Sep. 17, 2020.
(Continued)

(51) Int. Cl.
*H04N 19/46*    (2014.01)
*H04N 19/105*    (2014.01)
(Continued)

(52) U.S. Cl.
CPC ........... *H04N 19/46* (2014.11); *H04N 19/105* (2014.11); *H04N 19/172* (2014.11);
(Continued)

(58) Field of Classification Search
CPC .... H04N 19/46; H04N 19/105; H04N 19/172; H04N 19/187; H04N 19/423; H04N 19/70; H04N 19/30; H04N 19/184; H04N 19/44
(Continued)

(56) References Cited

U.S. PATENT DOCUMENTS

2014/0301477 A1* 10/2014 Deshpande ............ H04N 19/70
375/240.25
2015/0016545 A1    1/2015 Ramasubramonian et al.
(Continued)

FOREIGN PATENT DOCUMENTS

CN    104969554 A    10/2015
CN    105075262 A    11/2015
(Continued)

OTHER PUBLICATIONS

"Line Transmission of Non-Telephone Signals Video Codec for Audiovisual Services at px64 kbits," ITU-T Recommendation H.261, Mar. 1993, 29 pages.
(Continued)

*Primary Examiner* — Marnie A Matt
(74) *Attorney, Agent, or Firm* — Conley Rose, P.C.

(57) ABSTRACT

A method of decoding is provided. The method includes receiving a video bitstream including a plurality of layers and a sequence parameter set (SPS) including a flag, wherein each of the plurality of layers referring to the SPS has a same set of (DPB) parameters regardless of whether each of the plurality of layers is an output layer or a non-output layer when the flag has a first value, and wherein each of the plurality of layers referring to the SPS has a first set of DPB parameters that apply to output layers and a second set of DPB parameters that apply to non-output layers when the flag has a second value; and decoding a picture from one of the plurality of layers to obtain a decoded picture. A corresponding method of encoding is also provided.

27 Claims, 12 Drawing Sheets

Related U.S. Application Data

(60) Provisional application No. 62/905,139, filed on Sep. 24, 2019.

(51) Int. Cl.
*H04N 19/172* (2014.01)
*H04N 19/423* (2014.01)
*H04N 19/187* (2014.01)
*H04N 19/70* (2014.01)

(52) U.S. Cl.
CPC ......... *H04N 19/187* (2014.11); *H04N 19/423* (2014.11); *H04N 19/70* (2014.11)

(58) Field of Classification Search
USPC ................................................... 375/240.26
See application file for complete search history.

(56) References Cited

U.S. PATENT DOCUMENTS

| | | | |
|---|---|---|---|
| 2015/0103884 A1 | 4/2015 | Ramasubramonian et al. | |
| 2015/0103926 A1 | 4/2015 | Hannuksela | |
| 2015/0103927 A1* | 4/2015 | Hannuksela | H04N 19/159 |
| | | | 375/240.26 |
| 2015/0156501 A1* | 6/2015 | Hannuksela | H04N 19/70 |
| | | | 375/240.12 |
| 2015/0264404 A1* | 9/2015 | Hannuksela | H04N 19/30 |
| | | | 375/240.16 |
| 2015/0271498 A1* | 9/2015 | Wang | H04N 19/37 |
| | | | 375/240.02 |
| 2015/0271525 A1 | 9/2015 | Hendry et al. | |
| 2015/0341644 A1 | 11/2015 | Narasimhan et al. | |
| 2015/0373361 A1 | 12/2015 | Wang et al. | |
| 2016/0255373 A1 | 9/2016 | Deshpande | |
| 2017/0006300 A1 | 1/2017 | Tsukuba et al. | |
| 2017/0019673 A1 | 1/2017 | Tsukuba et al. | |
| 2017/0201766 A1 | 7/2017 | Choi | |
| 2019/0075311 A1 | 3/2019 | Deshpande | |

FOREIGN PATENT DOCUMENTS

| | | |
|---|---|---|
| CN | 105122815 A | 12/2015 |
| CN | 105637878 A | 6/2016 |
| CN | 106170981 A | 11/2016 |
| JP | 2016518041 A | 6/2016 |
| JP | 2016539537 A | 12/2016 |
| JP | 2017513372 A | 5/2017 |
| WO | 2015054509 A1 | 4/2015 |
| WO | 2015137432 A1 | 9/2015 |
| WO | 2016185090 A1 | 11/2016 |
| WO | 2016193544 A1 | 12/2016 |
| WO | 2021061386 A1 | 4/2021 |

OTHER PUBLICATIONS

"Transmission of Non-Telephone Signals; Information Technology—Generic Coding of Moving Pictures and Associated Audio Information: Video," ITU-T Recommendation H.262, Jul. 1995, 211 pages.

"Series H: Audiovisual and Multimedia Systems; Infrastructure of audiovisual services—Coding of moving video; Video coding for low bit rate communication," ITU-T Recommendation H.263, Jan. 2005, 226 pages.

"Series H: Audiovisual and Multimedia Systems; Infrastructure of audiovisual services—Coding of moving video; Advanced video coding for generic audiovisual services," Recommendation ITU-T H.264, Jun. 2019, 836 pages.

"Series H: Audiovisual and Multimedia Systems; Infrastructure of audiovisual services—Coding of moving video; High efficiency video coding" Recommendation ITU-T H.265, Apr. 2013, 317 pages.

JVET-O2001-VE, Bross, B., et al., "Versatile Video Coding (Draft 6)," Joint Video Experts Team (JVET) of ITU-T SG 16 WP 3 and ISO/IEC JTC 1/SC 29/WG 11, 15th Meeting: Gothenburg, SE, Jul. 3-12, 2019, 455 pages.

Sjoberg, R., et al., "Overview of HEVC High-Level Syntax and Reference Picture Management," IEEE Transactions on Circuits and Systems for Video Technology, vol. 22, No. 12, Dec. 2012, pp. 1858-1870.

Document: JVET-P0117-v1, Ye-Kui Wang et al, AHG8: Scalability—PTL and decoder capability, Joint Video Experts Team (JVET) of ITU-T SG 16 WP 3 and 1SO/IEC JTC 1/SC 29/WG 11, 16th Meeting: Geneva, CH, Oct. 1-11, 2019, 4 pages.

Pan Feng et al, A multiview video coding scheme based on multi-reference block, Journal of Beijing Institute of Machinery, vol. 23, No. 3, Sep. 2008, with the English Abstract, 3 pages.

Document: JVET-02001-vD, Benjamin Bross et al, Versatile Video Coding (Draft 6), Joint Video Experts Team (JVET) of ITU-T SG 16 WP 3 and 1SO/IEC JTC 1/SC 29/WG 11 15th Meeting: Gothenburg, SE, Jul. 3-12, 2019, 474 pages.

Document: JVET-P0118-v4, Ye-Kui Wang, AHG8: Scalability—HRD, Joint Video Experts Team (JVET) of ITU-T SG 16 WP 3 and 1SO/IEC JTC 1/SC 29/WG 11 16th Meeting: Geneva, CH, Oct. 1-11, 2019, 4 pages.

Document: JCTVC-P0132, Document: JCT3V-G0133, Ye-Kui Wang et al, On alt_output_layer_flag, Joint Collaborative Team on Video Coding (JCT-VC) of ITU-T SG 16 WP 3 and ISO/IEC JTC 1/SC 29/WG 11, 16th Meeting: San Jos , US, Jan. 9-17, 2014, 5 pages.

Document: JVET-P0118-v4, Ye-Kui Wang et al, AHG8: Scalability—HRD, Joint Video Experts Team (JVET) of ITU-T SG 16 WP 3 and ISO/IEC JTC 1/SC 29/WG 11 16th Meeting: Geneva, CH, Oct. 1-11, 2019, 5 pages.

Jill M. Boyce et al., Overview of SHVC: Scalable Extensions of the High Ef ciency Video Coding Standard, IEEE Transactions On Circuits and Systems for Video Technology, vol. 26, No. 1, Jan. 2016, 15 pages.

* cited by examiner

SIGNALING OF DPB PARAMETERS FOR MULTI-LAYER VIDEO BITSTREAMS

CROSS-REFERENCE TO RELATED APPLICATIONS

This patent application is a continuation of International Application No. PCT/US2020/051279 filed on Sep. 17, 2020, by Futurewei Technologies, Inc., and titled "Signaling Of DPB Parameters For Multi-Layer Video Bitstreams," which claims the benefit of U.S. Provisional Patent Application No. 62/905,139 filed Sep. 24, 2019, by Futurewei Technologies, Inc., and titled "Signalling Of DPB Sizes For Multi-Layer Video Bitstreams," which is hereby incorporated by reference.

TECHNICAL FIELD

In general, this disclosure describes techniques for multi-layer video bitstreams in video coding. More specifically, this disclosure describes techniques for signaling decoded picture buffer (DPB) parameters in multi-layer bitstream in video coding.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

A first aspect relates to a method of decoding implemented by a video decoder, comprising receiving, by the video decoder, a video bitstream including a plurality of layers and a sequence parameter set (SPS) including a flag, wherein each of the plurality of layers referring to the SPS has a same set of (DPB) parameters regardless of whether each of the plurality of layers is an output layer or a non-output layer when the flag has a first value, and wherein each of the plurality of layers referring to the SPS has a first set of DPB parameters that apply to output layers and a second set of DPB parameters that apply to non-output layers when the flag has a second value; and decoding, by the video decoder, a picture from one of the plurality of layers to obtain a decoded picture.

The method provides techniques that utilize a flag to specify whether each of the plurality of layers or sublayers referring to a sequence parameter set (SPS) has a same set of (DPB) parameters and/or level information regardless of whether each of the plurality of layers or sublayers is an output layer or a non-output layer or whether each of the plurality of layers or sublayers referring to the SPS has one set of DPB parameters that apply to output layers and another set of DPB parameters that apply to non-output layers. By using the flag, the same DPB parameters are not repeatedly signaled for the same layer or sublayer in some circumstances, which reduces redundancy and increases coding efficiency for multi-layer video bitstreams. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides using the same set of DPB parameters to allocate memory for use in the decoding when the flag has the first value.

Optionally, in any of the preceding aspects, another implementation of the aspect provides using the first set of DPB parameters to allocate memory for use in the decoding when the flag has the second value and the layers are output layers, and using the second set of DPB parameters to allocate memory for use in the decoding when the flag has the second value and the layers are non-output layers.

Optionally, in any of the preceding aspects, another implementation of the aspect provides selecting the output layer from the plurality of layers prior to the decoding, and selecting the picture from the output layer after the output layer has been selected.

Optionally, in any of the preceding aspects, another implementation of the aspect provides selecting the output layer from the plurality of layers prior to the decoding, and selecting the picture from the output layer after the output layer has been selected.

Optionally, in any of the preceding aspects, another implementation of the aspect provides inferring a second DPB size from a first DPB size included in the DPB size parameters.

Optionally, in any of the preceding aspects, another implementation of the aspect provides that the DPB parameters include a picture reorder number and latency information.

Optionally, in any of the preceding aspects, another implementation of the aspect provides that each of the plurality of layers referring to the SPS has a same level information regardless of whether each of the plurality of layers is the output layer or the non-output layer when the flag has a first value.

Optionally, in any of the preceding aspects, another implementation of the aspect provides that one or more of the plurality of layers comprises one or more sublayers.

Optionally, in any of the preceding aspects, another implementation of the aspect provides displaying the decoded picture on a display of an electronic device.

A second aspect relates to a method of encoding implemented by a video encoder, the method comprising generating, by the video encoder, a plurality of layers and a sequence parameter set (SPS) including a flag; setting, by the video encoder, the flag in the SPS to a first value or a second value, wherein the first value specifies that each of the plurality of layers referring to the SPS has a same set of decoded picture buffer (DPB) parameters regardless of whether each of the plurality of layers is an output layer or a non-output layer, and wherein the second value specifies that each of the plurality of layers referring to the SPS has a first set of DPB parameters that apply to output layers and a second set of DPB parameters that apply to non-output layers; encoding, by the video encoder, the plurality of layers and the SPS into a video bitstream; and storing, by the video encoder, the video bitstream for communication toward a video decoder.

The method provides techniques that utilize a flag to specify whether each of the plurality of layers or sublayers referring to a sequence parameter set (SPS) has a same set of (DPB) parameters and/or level information regardless of whether each of the plurality of layers or sublayers is an output layer or a non-output layer or whether each of the plurality of layers or sublayers referring to the SPS has one set of DPB parameters that apply to output layers and another set of DPB parameters that apply to non-output layers. By using the flag, the same DPB parameters are not repeatedly signaled for the same layer or sublayer in some circumstances, which reduces redundancy and increases coding efficiency for multi-layer video bitstreams. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that the DPB parameters comprise one or more DPB sizes.

Optionally, in any of the preceding aspects, another implementation of the aspect provides that the DPB parameters include only a single DPB size.

Optionally, in any of the preceding aspects, another implementation of the aspect provides that the DPB parameters includes one or more of a picture reorder number and latency information.

Optionally, in any of the preceding aspects, another implementation of the aspect provides that one or more of the plurality of layers comprises one or more sublayers.

A third aspect relates to a decoding device, comprising a receiver configured to receive a video bitstream including a plurality of layers and a sequence parameter set (SPS) including a flag, wherein each of the plurality of layers referring to the SPS has a same set of (DPB) parameters regardless of whether each of the plurality of layers is an output layer or a non-output layer when the flag has a first value, and wherein each of the plurality of layers referring to the SPS has a first set of DPB parameters that apply to output layers and a second set of DPB parameters that apply to non-output layers when the flag has a second value; a memory coupled to the receiver, the memory storing instructions; and a processor coupled to the memory, the processor configured to execute the instructions to cause the decoding device to decode a picture from one of the plurality of layers to obtain a decoded picture.

The decoding device provides techniques that utilize a flag to specify whether each of the plurality of layers or sublayers referring to a sequence parameter set (SPS) has a same set of (DPB) parameters and/or level information regardless of whether each of the plurality of layers or sublayers is an output layer or a non-output layer or whether each of the plurality of layers or sublayers referring to the SPS has one set of DPB parameters that apply to output layers and another set of DPB parameters that apply to non-output layers. By using the flag, the same DPB parameters are not repeatedly signaled for the same layer or sublayer in some circumstances, which reduces redundancy and increases coding efficiency for multi-layer video bitstreams. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that the processor is further configured to: select an output layer from one of the one or more layers prior to the decoding; and select the picture from the output layer after the output layer has been selected.

Optionally, in any of the preceding aspects, another implementation of the aspect provides that the DPB parameters comprise one or more DPB levels and one or more DPB sizes.

Optionally, in any of the preceding aspects, another implementation of the aspect provides that the processor is configured to infer a second DPB size from a first DPB size included in the DPB size parameters.

Optionally, in any of the preceding aspects, another implementation of the aspect provides that the DPB parameters include a picture reorder number.

Optionally, in any of the preceding aspects, another implementation of the aspect provides that the DPB parameters include latency information.

Optionally, in any of the preceding aspects, another implementation of the aspect provides that one or more of the plurality of layers comprises one or more sublayers.

Optionally, in any of the preceding aspects, another implementation of the aspect provides that a display configured to display the decoded picture.

A fourth aspect relates to an encoding device, comprising: a memory containing instructions; a processor coupled to the memory, the processor configured to implement the instructions to cause the encoding device to: generate a plurality of layers and a sequence parameter set (SPS) including a flag; set the flag in the SPS to a first value when each of the plurality of layers referring to the SPS has a same set of decoded picture buffer (DPB) parameters regardless of whether each of the plurality of layers is an output layer or a non-output layer; set the flag in the SPS to a second value when each of the plurality of layers referring to the SPS has a first set of DPB parameters that apply to output layers and a second set of DPB parameters that apply to non-output layers; and encode the plurality of layers and the SPS into a video bitstream; and a transmitter coupled to the processor, the transmitter configured to transmit the video bitstream toward a video decoder.

The encoding device provides techniques that utilize a flag to specify whether each of the plurality of layers or sublayers referring to a sequence parameter set (SPS) has a same set of (DPB) parameters and/or level information regardless of whether each of the plurality of layers or sublayers is an output layer or a non-output layer or whether each of the plurality of layers or sublayers referring to the SPS has one set of DPB parameters that apply to output layers and another set of DPB parameters that apply to non-output layers. By using the flag, the same DPB parameters are not repeatedly signaled for the same layer or sublayer in some circumstances, which reduces redundancy and increases coding efficiency for multi-layer video bitstreams. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that the processor is further configured to cause the encoding device to designate one of the plurality of layers as an output layer and designate another of the plurality of layers as a non-output layer.

gOptionally, in any of the preceding aspects, another implementation of the aspect provides that the DPB parameters comprise one or more DPB levels and one or more DPB sizes.

Optionally, in any of the preceding aspects, another implementation of the aspect provides that the DPB parameters include only a single DPB size.

Optionally, in any of the preceding aspects, another implementation of the aspect provides that one or more of the plurality of layers comprises one or more sublayers.

A fifth aspect relates to a coding apparatus. The coding apparatus includes a receiver configured to receive a picture to encode or to receive a bitstream to decode; a transmitter coupled to the receiver, the transmitter configured to transmit the bitstream to a decoder or to transmit a decoded image to a display; a memory coupled to at least one of the receiver or the transmitter, the memory configured to store instructions; and a processor coupled to the memory, the processor configured to execute the instructions stored in the memory to perform any of the methods disclosed herein.

The coding apparatus provides techniques that utilize a flag to specify whether each of the plurality of layers or sublayers referring to a sequence parameter set (SPS) has a same set of (DPB) parameters and/or level information regardless of whether each of the plurality of layers or sublayers is an output layer or a non-output layer or whether each of the plurality of layers or sublayers referring to the SPS has one set of DPB parameters that apply to output layers and another set of DPB parameters that apply to non-output layers. By using the flag, the same DPB parameters are not repeatedly signaled for the same layer or sublayer in some circumstances, which reduces redundancy and increases coding efficiency for multi-layer video bitstreams. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides a display configured to display a decoded picture.

A sixth aspect relates to a system. The system includes an encoder; and a decoder in communication with the encoder, wherein the encoder or the decoder includes the decoding device, the encoding device, or the coding apparatus disclosed herein.

The system provides techniques that utilize a flag to specify whether each of the plurality of layers or sublayers referring to a sequence parameter set (SPS) has a same set of (DPB) parameters and/or level information regardless of whether each of the plurality of layers or sublayers is an output layer or a non-output layer or whether each of the plurality of layers or sublayers referring to the SPS has one set of DPB parameters that apply to output layers and another set of DPB parameters that apply to non-output layers. By using the flag, the same DPB parameters are not repeatedly signaled for the same layer or sublayer in some circumstances, which reduces redundancy and increases coding efficiency for multi-layer video bitstreams. Thus, the coder/decoder (a.k.a., "codec") in video coding is improved relative to current codecs. As a practical matter, the improved video coding process offers the user a better user experience when videos are sent, received, and/or viewed.

A seventh aspect relates to a means for coding. The means for coding includes receiving means configured to receive a picture to encode or to receive a bitstream to decode; transmission means coupled to the receiving means, the transmission means configured to transmit the bitstream to a decoding means or to transmit a decoded image to a display means; storage means coupled to at least one of the receiving means or the transmission means, the storage means configured to store instructions; and processing means coupled to the storage means, the processing means configured to execute the instructions stored in the storage means to perform any of the methods disclosed herein.

The means for coding provides techniques that utilize a flag to specify whether each of the plurality of layers or sublayers referring to a sequence parameter set (SPS) has a same set of (DPB) parameters and/or level information regardless of whether each of the plurality of layers or sublayers is an output layer or a non-output layer or whether each of the plurality of layers or sublayers referring to the SPS has one set of DPB parameters that apply to output layers and another set of DPB parameters that apply to non-output layers. By using the flag, the same DPB parameters are not repeatedly signaled for the same layer or sublayer in some circumstances, which reduces redundancy and increases coding efficiency for multi-layer video bitstreams. Thus, the coder/decoder (a.k.a., "codec") in video coding is improved relative to current codecs. As a practical matter, the improved video coding process offers the user a better user experience when videos are sent, received, and/or viewed.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
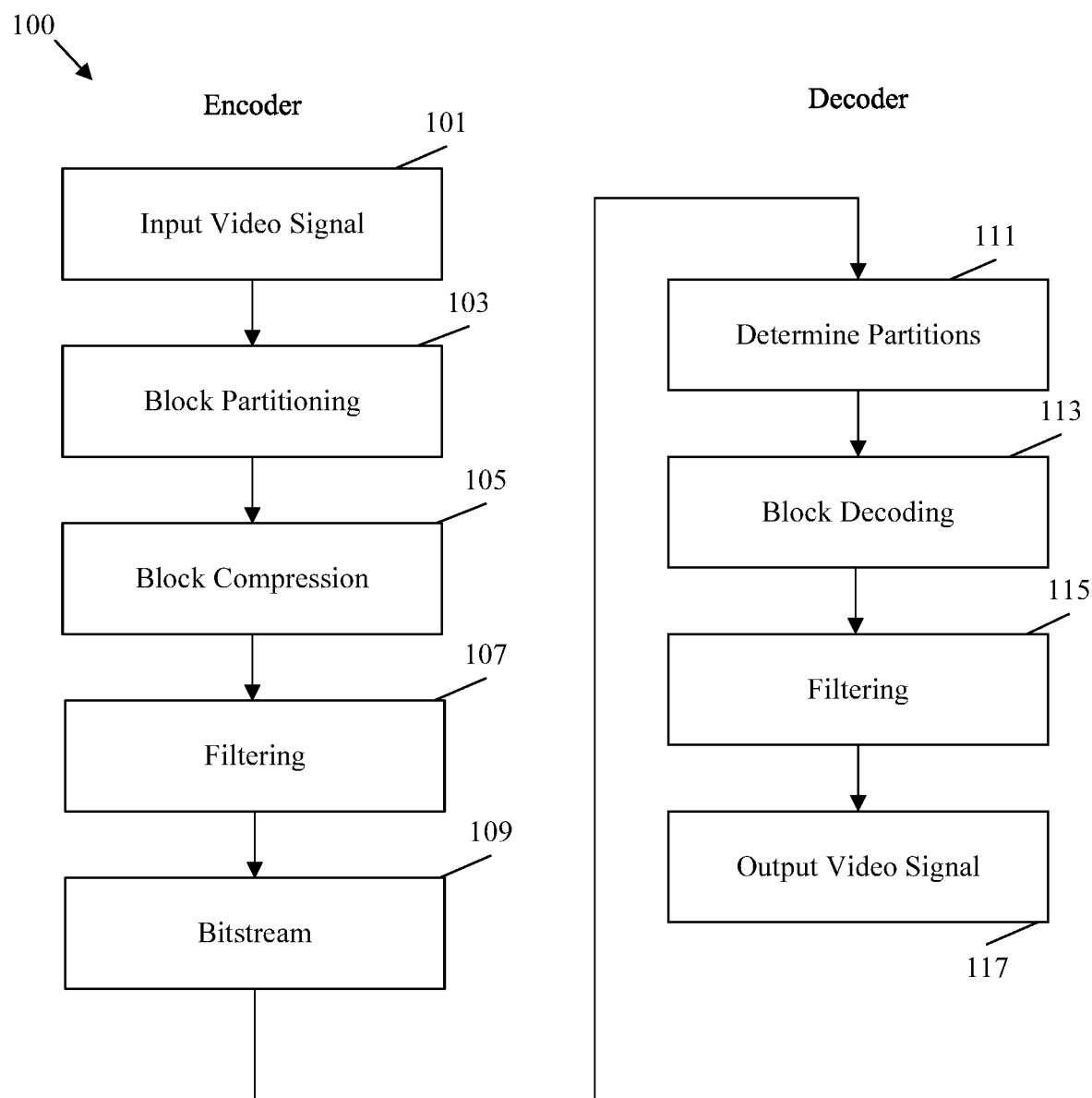
FIG. 1 is a flowchart of an example method of coding a video signal.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following terms are defined as follows unless used in a contrary context herein. Specifically, the following definitions are intended to provide additional clarity to the present disclosure. However, terms may be described differently in different contexts. Accordingly, the following definitions should be considered as a supplement and should not be considered to limit any other definitions of descriptions provided for such terms herein.

A bitstream is a sequence of bits including video data that is compressed for transmission between an encoder and a decoder. An encoder is a device that is configured to employ encoding processes to compress video data into a bitstream. A decoder is a device that is configured to employ decoding processes to reconstruct video data from a bitstream for display. A picture is an array of luma samples and/or an array of chroma samples that create a frame or a field thereof. A picture that is being encoded or decoded can be referred to as a current picture for clarity of discussion. A reference picture is a picture that contains reference samples that can be used when coding other pictures by reference according to inter-prediction and/or inter-layer prediction. A reference picture list is a list of reference pictures used for inter-prediction and/or inter-layer prediction. Some video coding systems utilize two reference picture lists, which can be denoted as reference picture list one and reference picture list zero. A reference picture list structure is an addressable syntax structure that contains multiple reference picture lists. Inter-prediction is a mechanism of coding samples of a current picture by reference to indicated samples in a reference picture that is different from the current picture where the reference picture and the current picture are in the same layer. A reference picture list structure entry is an addressable location in a reference picture list structure that indicates a reference picture associated with a reference picture list. A slice header is a part of a coded slice containing data elements pertaining to all video data within a tile represented in the slice. A picture parameter set (PPS) is a parameter set that contains data related to an entire picture. More specifically, the PPS is a syntax structure containing syntax elements that apply to zero or more entire coded pictures as determined by a syntax element found in each picture header. A sequence parameter set (SPS) is a parameter set that contains data related to a sequence of pictures. An access unit (AU) is a set of one or more coded pictures associated with the same display time (e.g., the same picture order count) for output from a decoded picture buffer (DPB) (e.g., for display to a user). An access unit delimiter (AUD) is an indicator or data structure used to indicate the start of an AU or the boundary between AUs. A decoded video sequence is a sequence of pictures that have been reconstructed by a decoder in preparation for display to a user.

A network abstraction layer (NAL) unit is a syntax structure containing data in the form of a Raw Byte Sequence Payload (RBSP), an indication of the type of data, and interspersed as desired with emulation prevention bytes. A video coding layer (VCL) NAL unit is a NAL unit coded to contain video data, such as a coded slice of a picture. A non-VCL NAL unit is a NAL unit that contains non-video data such as syntax and/or parameters that support decoding the video data, performance of conformance checking, or other operations. A layer is a set of VCL NAL units that share a specified characteristic (e.g., a common resolution, frame rate, image size, etc.) and associated non-VCL NAL units. The VCL NAL units of a layer may share a particular value of a NAL unit header layer identifier (nuh_layer_id). A coded picture is a coded representation of a picture comprising VCL NAL units with a particular value of a NAL unit header layer identifier (nuh_layer_id) within an access unit (AU) and containing all coding tree units (CTUs) of the picture. A decoded picture is a picture produced by applying a decoding process to a coded picture.

An output layer set (OLS) is a set of layers for which one or more layers are specified as output layer(s). An output layer is a layer that is designated for output (e.g., to a display). A zeroth (0-th) OLS is an OLS that contains only a lowest layer (layer with a lowest layer identifier) and hence contains only an output layer. A video parameter set (VPS) is a data unit that contains parameters related to an entire video. Inter-layer prediction is a mechanism of coding a current picture in a current layer by reference to a reference picture in a reference layer, where the current picture and the reference picture are included in the same AU and the reference layer includes a lower nuh_layer_id than the current layer.

Tiers and levels are constraints that define a bitstream in terms of maximum bit rate, maximum luma sample rate, maximum luma picture size, minimum compression ratio, maximum number of slices allowed, and maximum number of tiles allowed. Lower tiers are more constrained than higher tiers and lower levels are more constrained than higher levels.

A decoded picture buffer (DPB) is a buffer holding decoded pictures for reference, output reordering, or output delay specified for the hypothetical reference decoder. DPB parameters are a syntax structure that provides a DPB size and, optionally, a maximum picture reorder number and maximum latency information. A sublayer is a temporal scalable layer of a temporal scalable bitstream, consisting of VCL NAL units with a particular value of the TemporalId variable and the associated non-VCL NAL units. A flag is a variable or single-bit syntax element that can take one of the two possible values: 0 and 1.

The following acronyms are used herein, Coding Tree Block (CTB), Coding Tree Unit (CTU), Coding Unit (CU), Coded Video Sequence (CVS), Joint Video Experts Team (JVET), Motion-Constrained Tile Set (MCTS), Maximum Transfer Unit (MTU), Network Abstraction Layer (NAL), Picture Order Count (POC), Picture Parameter Set (PPS), Raw Byte Sequence Payload (RBSP), Sequence Parameter Set (SPS), Versatile Video Coding (VVC), and Working Draft (WD).

FIG. 1 is a flowchart of an example operating method 100 of coding a video signal. Specifically, a video signal is encoded at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 101, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components (or luma samples), and color, which is referred to as chroma components (or color samples). In some examples, the frames may also contain depth values to support three dimensional viewing.

At step 103, the video is partitioned into blocks. Partitioning includes subdividing the pixels in each frame into square and/or rectangular blocks for compression. For example, in High Efficiency Video Coding (HEVC) (also known as H.265 and MPEG-H Part 2) the frame can first be divided into coding tree units (CTUs), which are blocks of a predefined size (e.g., sixty-four pixels by sixty-four pixels). The CTUs contain both luma and chroma samples. Coding trees may be employed to divide the CTUs into blocks and then recursively subdivide the blocks until configurations are achieved that support further encoding. For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 105, various compression mechanisms are employed to compress the image blocks partitioned at step 103. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in adjacent frames. Specifically, an object, such as a table, may remain in a constant position over multiple frames. Hence the table is described once and adjacent frames can refer back to the reference frame. Pattern matching mechanisms may be employed to match objects over multiple frames. Further, moving objects may be represented across multiple frames, for example due to object movement or camera movement. As a particular example, a video may show an automobile that moves across the screen over multiple frames. Motion vectors can be employed to describe such movement. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty-three in HEVC), a planar mode, and a direct current (DC) mode. The directional modes indicate that a current block is similar/the same as samples of a neighbor block in a corresponding direction. Planar mode indicates that a series of blocks along a row/column (e.g., a plane) can be interpolated based on neighbor blocks at the edges of the row. Planar mode, in effect, indicates a smooth transition of light/color across a row/column by employing a relatively constant slope in changing values. DC mode is employed for boundary smoothing and indicates that a block is similar/the same as an average value associated with samples of all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 107, various filtering techniques may be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and sample adaptive offset (SAO) filters to the blocks/frames. These filters mitigate such blocking artifacts so that the encoded file can be accurately reconstructed. Further, these filters mitigate artifacts in the reconstructed reference blocks so that artifacts are less likely to create additional artifacts in subsequent blocks that are encoded based on the reconstructed reference blocks.

Once the video signal has been partitioned, compressed, and filtered, the resulting data is encoded in a bitstream at step 109. The bitstream includes the data discussed above as well as any signaling data desired to support proper video signal reconstruction at the decoder. For example, such data may include partition data, prediction data, residual blocks, and various flags providing coding instructions to the decoder. The bitstream may be stored in memory for transmission toward a decoder upon request. The bitstream may also be broadcast and/or multicast toward a plurality of decoders. The creation of the bitstream is an iterative process. Accordingly, steps 101, 103, 105, 107, and 109 may occur continuously and/or simultaneously over many frames and blocks. The order shown in FIG. 1 is presented for clarity and ease of discussion, and is not intended to limit the video coding process to a particular order.

The decoder receives the bitstream and begins the decoding process at step 111. Specifically, the decoder employs an entropy decoding scheme to convert the bitstream into corresponding syntax and video data. The decoder employs the syntax data from the bitstream to determine the partitions for the frames at step 111. The partitioning should match the results of block partitioning at step 103. Entropy encoding/decoding as employed in step 111 is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as a variable (e.g., a bit value that may vary depending on context). Entropy coding allows the encoder to discard any options that are clearly not viable for a particular case, leaving a set of allowable options. Each allowable option is then assigned a code word. The length of the code words is based on the number of allowable options (e.g., one bin for two options, two bins for three to four options, etc.) The encoder then encodes the code word for the selected option. This scheme reduces the size of the code words as the code words are as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 113, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 105. The reconstructed image blocks are then positioned into frames of a reconstructed video signal according to the partitioning data determined at step 111. Syntax for step 113 may also be signaled in the bitstream via entropy coding as discussed above.

At step 115, filtering is performed on the frames of the reconstructed video signal in a manner similar to step 107 at the encoder. For example, noise suppression filters, de-blocking filters, adaptive loop filters, and SAO filters may be applied to the frames to remove blocking artifacts. Once the frames are filtered, the video signal can be output to a display at step 117 for viewing by an end user.

Figure 2:
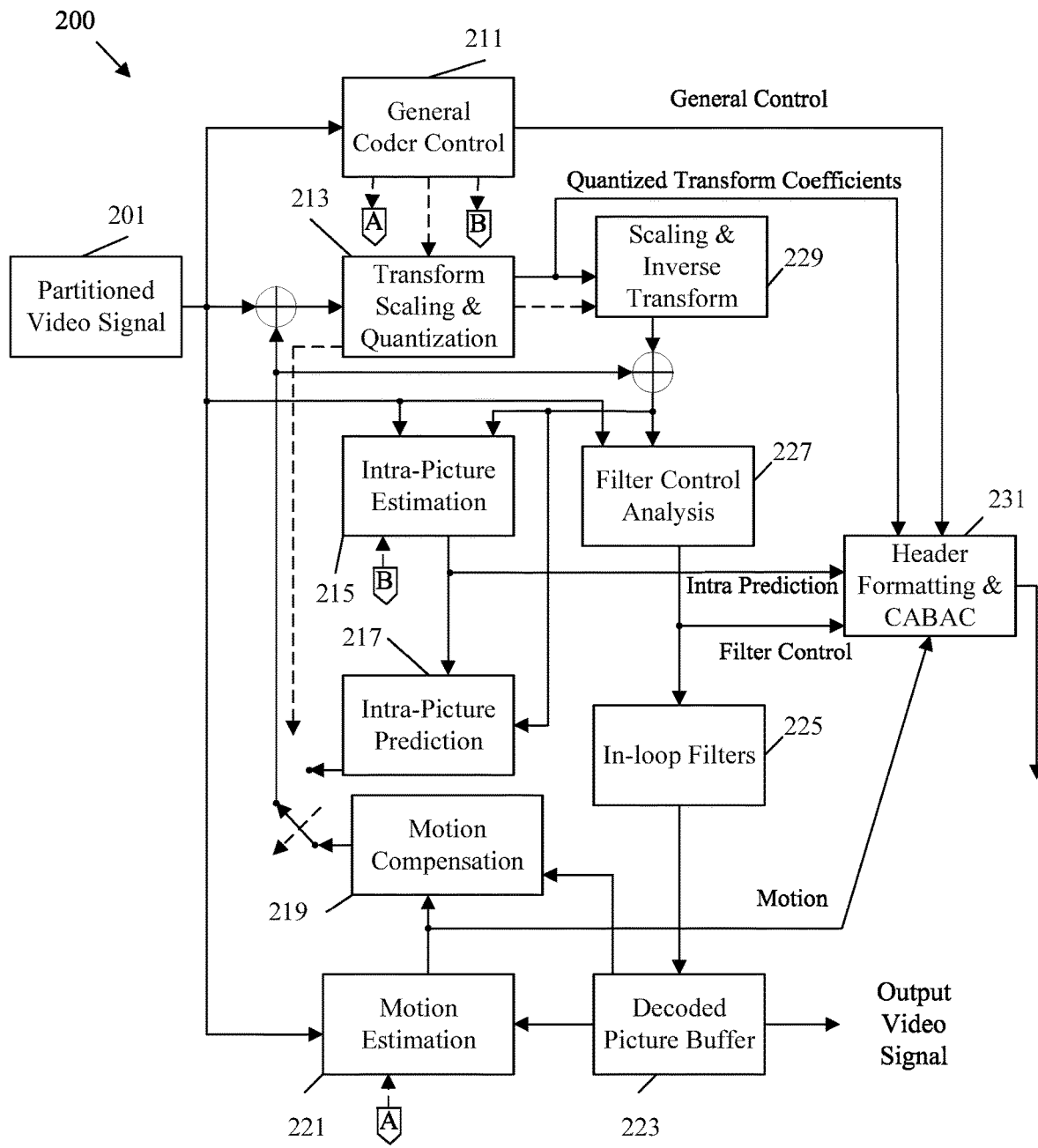
FIG. 2 is a schematic diagram of an example coding and decoding (codec) system for video coding.

FIG. 2 is a schematic diagram of an example coding and decoding (codec) system 200 for video coding. Specifically, codec system 200 provides functionality to support the implementation of operating method 100. Codec system 200 is generalized to depict components employed in both an encoder and a decoder. Codec system 200 receives and partitions a video signal as discussed with respect to steps 101 and 103 in operating method 100, which results in a partitioned video signal 201. Codec system 200 then compresses the partitioned video signal 201 into a coded bitstream when acting as an encoder as discussed with respect to steps 105, 107, and 109 in method 100. When acting as a decoder, codec system 200 generates an output video signal from the bitstream as discussed with respect to steps 111, 113, 115, and 117 in operating method 100. The codec system 200 includes a general coder control component 211, a transform scaling and quantization component 213, an intra-picture estimation component 215, an intra-picture prediction component 217, a motion compensation component 219, a motion estimation component 221, a scaling and inverse transform component 229, a filter control analysis component 227, an in-loop filters component 225, a decoded picture buffer component 223, and a header formatting and context adaptive binary arithmetic coding (CABAC) component 231. Such components are coupled as shown. In FIG. 2, black lines indicate movement of data to be encoded/decoded while dashed lines indicate movement of control data that controls the operation of other components. The components of codec system 200 may all be present in the encoder. The decoder may include a subset of the components of codec system 200. For example, the decoder may include the intra-picture prediction component 217, the motion compensation component 219, the scaling and inverse transform component 229, the in-loop filters component 225, and the decoded picture buffer component 223. These components are now described.

The partitioned video signal 201 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in coding units (CUs) in some cases. For example, a CU can be a sub-portion of a CTU that contains a luma block, red difference chroma (Cr) block(s), and a blue difference chroma (Cb) block(s) along with corresponding syntax instructions for the CU. The split modes may include a binary tree (BT), triple tree (TT), and a quad tree (QT) employed to partition a node into two, three, or four child nodes, respectively, of varying shapes depending on the split modes employed. The partitioned video signal 201 is forwarded to the general coder control component 211, the transform scaling and quantization component 213, the intra-picture estimation component 215, the filter control analysis component 227, and the motion estimation component 221 for compression.

The general coder control component 211 is configured to make decisions related to coding of the images of the video sequence into the bitstream according to application constraints. For example, the general coder control component 211 manages optimization of bitrate/bitstream size versus reconstruction quality. Such decisions may be made based on storage space/bandwidth availability and image resolution requests. The general coder control component 211 also manages buffer utilization in light of transmission speed to mitigate buffer underrun and overrun issues. To manage these issues, the general coder control component 211 manages partitioning, prediction, and filtering by the other components. For example, the general coder control component 211 may dynamically increase compression complexity to increase resolution and increase bandwidth usage or decrease compression complexity to decrease resolution and bandwidth usage. Hence, the general coder control component 211 controls the other components of codec system 200 to balance video signal reconstruction quality with bit rate concerns. The general coder control component 211 creates control data, which controls the operation of the other components. The control data is also forwarded to the header formatting and CABAC component 231 to be encoded in the bitstream to signal parameters for decoding at the decoder.

The partitioned video signal 201 is also sent to the motion estimation component 221 and the motion compensation component 219 for inter-prediction. A frame or slice of the partitioned video signal 201 may be divided into multiple video blocks. Motion estimation component 221 and the motion compensation component 219 perform inter-predictive coding of the received video block relative to one or more blocks in one or more reference frames to provide temporal prediction. Codec system 200 may perform multiple coding passes, e.g., to select an appropriate coding mode for each block of video data.

Motion estimation component 221 and motion compensation component 219 may be highly integrated, but are illustrated separately for conceptual purposes. Motion estimation, performed by motion estimation component 221, is the process of generating motion vectors, which estimate motion for video blocks. A motion vector, for example, may indicate the displacement of a coded object relative to a predictive block. A predictive block is a block that is found to closely match the block to be coded, in terms of pixel difference. A predictive block may also be referred to as a reference block. Such pixel difference may be determined by sum of absolute difference (SAD), sum of square difference (SSD), or other difference metrics. HEVC employs several coded objects including a CTU, coding tree blocks (CTBs), and CUs. For example, a CTU can be divided into CTBs, which can then be divided into CBs for inclusion in CUs. A CU can be encoded as a prediction unit (PU) containing prediction data and/or a transform unit (TU) containing transformed residual data for the CU. The motion estimation component 221 generates motion vectors, PUs, and TUs by using a rate-distortion analysis as part of a rate distortion optimization process. For example, the motion estimation component 221 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec system 200 may calculate values for sub-integer pixel positions of reference pictures stored in decoded picture buffer component 223. For example, video codec system 200 may interpolate values of one-quarter pixel positions, one-eighth pixel positions, or other fractional pixel positions of the reference picture. Therefore, motion estimation component 221 may perform a motion search relative to the full pixel positions and fractional pixel positions and output a motion vector with fractional pixel precision. The motion estimation component 221 calculates a motion vector for a PU of a video block in an inter-coded slice by comparing the position of the PU to the position of a predictive block of a reference picture. Motion estimation component 221 outputs the calculated motion vector as motion data to header formatting and CABAC component 231 for encoding and motion to the motion compensation component 219.

Motion compensation, performed by motion compensation component 219, may involve fetching or generating the predictive block based on the motion vector determined by motion estimation component 221. Again, motion estimation component 221 and motion compensation component 219 may be functionally integrated, in some examples. Upon receiving the motion vector for the PU of the current video block, motion compensation component 219 may locate the predictive block to which the motion vector points. A residual video block is then formed by subtracting pixel values of the predictive block from the pixel values of the current video block being coded, forming pixel difference values. In general, motion estimation component 221 performs motion estimation relative to luma components, and motion compensation component 219 uses motion vectors calculated based on the luma components for both chroma components and luma components. The predictive block and residual block are forwarded to transform scaling and quantization component 213.

The partitioned video signal 201 is also sent to intra-picture estimation component 215 and intra-picture prediction component 217. As with motion estimation component 221 and motion compensation component 219, intra-picture estimation component 215 and intra-picture prediction component 217 may be highly integrated, but are illustrated separately for conceptual purposes. The intra-picture estimation component 215 and intra-picture prediction component 217 intra-predict a current block relative to blocks in a current frame, as an alternative to the inter-prediction performed by motion estimation component 221 and motion compensation component 219 between frames, as described above. In particular, the intra-picture estimation component 215 determines an intra-prediction mode to use to encode a current block. In some examples, intra-picture estimation component 215 selects an appropriate intra-prediction mode to encode a current block from multiple tested intra-prediction modes. The selected intra-prediction modes are then forwarded to the header formatting and CABAC component 231 for encoding.

For example, the intra-picture estimation component 215 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 215 calculates ratios from the distortions and rates for the various encoded blocks to determine which intra-prediction mode exhibits the best rate-distortion value for the block. In addition, intra-picture estimation component 215 may be configured to code depth blocks of a depth map using a depth modeling mode (DMM) based on rate-distortion optimization (RDO).

The intra-picture prediction component 217 may generate a residual block from the predictive block based on the selected intra-prediction modes determined by intra-picture estimation component 215 when implemented on an encoder or read the residual block from the bitstream when implemented on a decoder. The residual block includes the difference in values between the predictive block and the original block, represented as a matrix. The residual block is then forwarded to the transform scaling and quantization component 213. The intra-picture estimation component 215 and the intra-picture prediction component 217 may operate on both luma and chroma components.

The transform scaling and quantization component 213 is configured to further compress the residual block. The transform scaling and quantization component 213 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 213 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 213 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 213 may then perform a scan of the matrix including the quantized transform coefficients. The quantized transform coefficients are forwarded to the header formatting and CABAC component 231 to be encoded in the bitstream.

The scaling and inverse transform component 229 applies a reverse operation of the transform scaling and quantization component 213 to support motion estimation. The scaling and inverse transform component 229 applies inverse scaling, transformation, and/or quantization to reconstruct the residual block in the pixel domain, e.g., for later use as a reference block which may become a predictive block for another current block. The motion estimation component 221 and/or motion compensation component 219 may calculate a reference block by adding the residual block back to a corresponding predictive block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 227 and the in-loop filters component 225 apply the filters to the residual blocks and/or to reconstructed image blocks. For example, the transformed residual block from the scaling and inverse transform component 229 may be combined with a corresponding prediction block from intra-picture prediction component 217 and/or motion compensation component 219 to reconstruct the original image block. The filters may then be applied to the reconstructed image block. In some examples, the filters may instead be applied to the residual blocks. As with other components in FIG. 2, the filter control analysis component 227 and the in-loop filters component 225 are highly integrated and may be implemented together, but are depicted separately for conceptual purposes. Filters applied to the reconstructed reference blocks are applied to particular spatial regions and include multiple parameters to adjust how such filters are applied. The filter control analysis component 227 analyzes the reconstructed reference blocks to determine where such filters should be applied and sets corresponding parameters. Such data is forwarded to the header formatting and CABAC component 231 as filter control data for encoding. The in-loop filters component 225 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 223 for later use in motion estimation as discussed above. When operating as a decoder, the decoded picture buffer component 223 stores and forwards the reconstructed and filtered blocks toward a display as part of an output video signal. The decoded picture buffer component 223 may be any memory device capable of storing prediction blocks, residual blocks, and/or reconstructed image blocks.

The header formatting and CABAC component 231 receives the data from the various components of codec system 200 and encodes such data into a coded bitstream for transmission toward a decoder. Specifically, the header formatting and CABAC component 231 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 201. Such information may also include intra-prediction mode index tables (also referred to as codeword mapping tables), definitions of encoding contexts for various blocks, indications of most probable intra-prediction modes, an indication of partition information, etc. Such data may be encoded by employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

Figure 3:
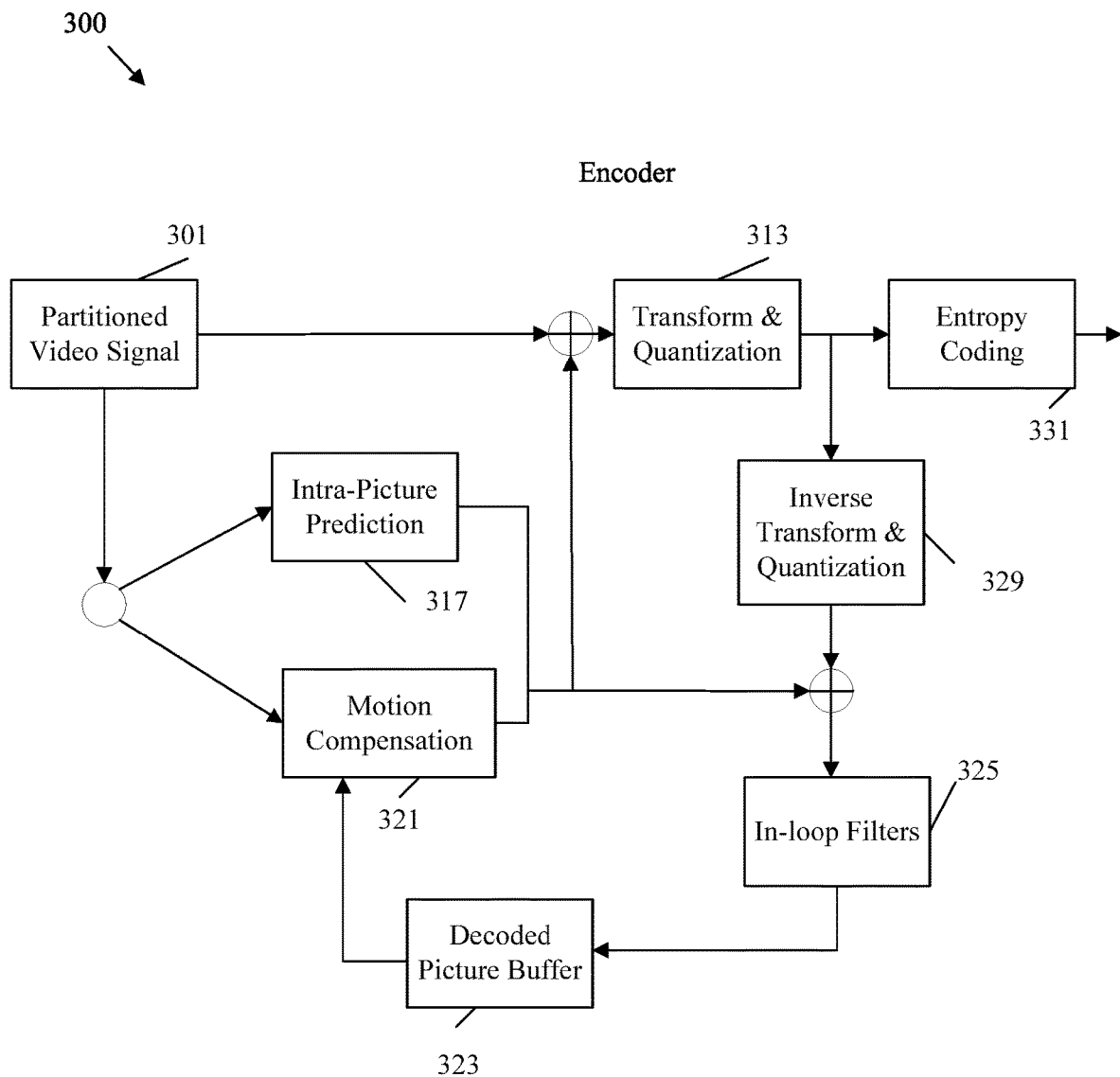
FIG. 3 is a schematic diagram illustrating an example video encoder.

FIG. 3 is a block diagram illustrating an example video encoder 300. Video encoder 300 may be employed to implement the encoding functions of codec system 200 and/or implement steps 101, 103, 105, 107, and/or 109 of operating method 100. Encoder 300 partitions an input video signal, resulting in a partitioned video signal 301, which is substantially similar to the partitioned video signal 201. The partitioned video signal 301 is then compressed and encoded into a bitstream by components of encoder 300.

Specifically, the partitioned video signal 301 is forwarded to an intra-picture prediction component 317 for intra-prediction. The intra-picture prediction component 317 may be substantially similar to intra-picture estimation component 215 and intra-picture prediction component 217. The partitioned video signal 301 is also forwarded to a motion compensation component 321 for inter-prediction based on reference blocks in a decoded picture buffer component 323. The motion compensation component 321 may be substantially similar to motion estimation component 221 and motion compensation component 219. The prediction blocks and residual blocks from the intra-picture prediction component 317 and the motion compensation component 321 are forwarded to a transform and quantization component 313 for transform and quantization of the residual blocks. The transform and quantization component 313 may be substantially similar to the transform scaling and quantization component 213. The transformed and quantized residual blocks and the corresponding prediction blocks (along with associated control data) are forwarded to an entropy coding component 331 for coding into a bitstream. The entropy coding component 331 may be substantially similar to the header formatting and CABAC component 231.

The transformed and quantized residual blocks and/or the corresponding prediction blocks are also forwarded from the transform and quantization component 313 to an inverse transform and quantization component 329 for reconstruction into reference blocks for use by the motion compensation component 321. The inverse transform and quantization component 329 may be substantially similar to the scaling and inverse transform component 229. In-loop filters in an in-loop filters component 325 are also applied to the residual blocks and/or reconstructed reference blocks, depending on the example. The in-loop filters component 325 may be substantially similar to the filter control analysis component 227 and the in-loop filters component 225. The in-loop filters component 325 may include multiple filters as discussed with respect to in-loop filters component 225. The filtered blocks are then stored in a decoded picture buffer component 323 for use as reference blocks by the motion compensation component 321. The decoded picture buffer component 323 may be substantially similar to the decoded picture buffer component 223.

Figure 4:
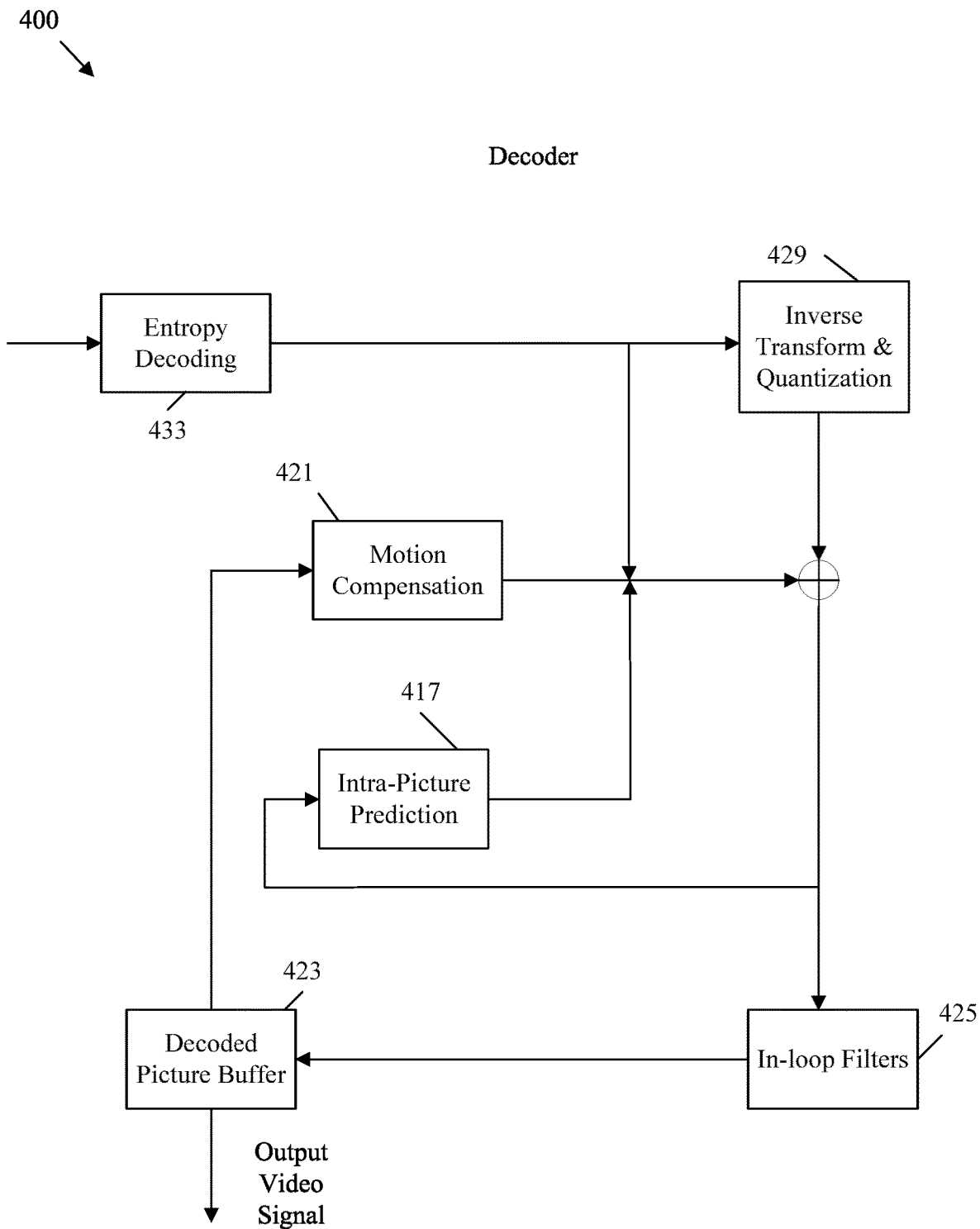
FIG. 4 is a schematic diagram illustrating an example video decoder.

FIG. 4 is a block diagram illustrating an example video decoder 400. Video decoder 400 may be employed to implement the decoding functions of codec system 200 and/or implement steps 111, 113, 115, and/or 117 of operating method 100. Decoder 400 receives a bitstream, for example from an encoder 300, and generates a reconstructed output video signal based on the bitstream for display to an end user.

The bitstream is received by an entropy decoding component 433. The entropy decoding component 433 is configured to implement an entropy decoding scheme, such as CAVLC, CABAC, SBAC, PIPE coding, or other entropy coding techniques. For example, the entropy decoding component 433 may employ header information to provide a context to interpret additional data encoded as codewords in the bitstream. The decoded information includes any desired information to decode the video signal, such as general control data, filter control data, partition information, motion data, prediction data, and quantized transform coefficients from residual blocks. The quantized transform coefficients are forwarded to an inverse transform and quantization component 429 for reconstruction into residual blocks. The inverse transform and quantization component 429 may be similar to inverse transform and quantization component 329.

The reconstructed residual blocks and/or prediction blocks are forwarded to intra-picture prediction component 417 for reconstruction into image blocks based on intra-prediction operations. The intra-picture prediction component 417 may be similar to intra-picture estimation component 215 and to intra-picture prediction component 217. Specifically, the intra-picture prediction component 417 employs prediction modes to locate a reference block in the frame and applies a residual block to the result to reconstruct intra-predicted image blocks. The reconstructed intra-predicted image blocks and/or the residual blocks and corresponding inter-prediction data are forwarded to a decoded picture buffer component 423 via an in-loop filters component 425, which may be substantially similar to decoded picture buffer component 223 and in-loop filters component 225, respectively. The in-loop filters component 425 filters the reconstructed image blocks, residual blocks and/or prediction blocks, and such information is stored in the decoded picture buffer component 423. Reconstructed image blocks from decoded picture buffer component 423 are forwarded to a motion compensation component 421 for inter-prediction. The motion compensation component 421 may be substantially similar to motion estimation component 221 and/or motion compensation component 219. Specifically, the motion compensation component 421 employs motion vectors from a reference block to generate a prediction block and applies a residual block to the result to reconstruct an image block. The resulting reconstructed blocks may also be forwarded via the in-loop filters component 425 to the decoded picture buffer component 423. The decoded picture buffer component 423 continues to store additional reconstructed image blocks, which can be reconstructed into frames via the partition information. Such frames may also be placed in a sequence. The sequence is output toward a display as a reconstructed output video signal.

Keeping the above in mind, video compression techniques perform spatial (intra-picture) prediction and/or temporal (inter-picture) prediction to reduce or remove redundancy inherent in video sequences. For block-based video coding, a video slice (i.e., a video picture or a portion of a video picture) may be partitioned into video blocks, which may also be referred to as treeblocks, coding tree blocks (CTBs), coding tree units (CTUs), coding units (CUs), and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames. The POC is a variable associated with each picture that uniquely identifies the associated picture among all pictures in the coded layer video sequence (CLVS), indicates when the associated picture is to be output from the DPB, and indicates the position of the associated picture in output order relative to the output order positions of the other pictures in the same CLVS that are to be output from the DPB. A flag is a variable or single-bit syntax element that can take one of the two possible values: 0 and 1.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

Image and video compression has experienced rapid growth, leading to various coding standards. Such video coding standards include ITU-T H.261, International Organization for Standardization/International Electrotechnical Commission (ISO/IEC) MPEG-1 Part 2, ITU-T H.262 or ISO/IEC MPEG-2 Part 2, ITU-T H.263, ISO/IEC MPEG-4 Part 2, Advanced Video Coding (AVC), also known as ITU-T H.264 or ISO/IEC MPEG-4 Part 10, and High Efficiency Video Coding (HEVC), also known as ITU-T H.265 or MPEG-H Part 2. AVC includes extensions such as Scalable Video Coding (SVC), Multiview Video Coding (MVC) and Multiview Video Coding plus Depth (MVC+D), and 3D AVC (3D-AVC). HEVC includes extensions such as Scalable HEVC (SHVC), Multiview HEVC (MV-HEVC), and 3D HEVC (3D-HEVC).

There is also a new video coding standard, named Versatile Video Coding (VVC), being developed by the joint video experts team (JVET) of ITU-T and ISO/IEC. While the VVC standard has several working drafts, one Working Draft (WD) of VVC in particular, namely B. Bross, J. Chen, and S. Liu, "Versatile Video Coding (Draft 5)," JVET-N1001-v3, 13th JVET Meeting, Mar. 27, 2019 (VVC Draft 5) is referenced herein.

Scalability in video coding usually is supported by using multi-layer coding techniques. A multi-layer bitstream comprises a base layer (BL) and one or more enhancement layers (ELs). An example of scalabilities includes spatial scalability, quality/signal-to-noise (SNR) scalability, multi-view scalability, etc. When a multi-layer coding technique is used, a picture or a part thereof may be coded (1) without using a reference picture, i.e., using intra prediction; (2) by referencing to reference pictures that are in the same layer, i.e., using inter prediction; or (3) by referencing to reference pictures that are in other layer(s), i.e., using inter-layer prediction. A reference picture used for inter-layer prediction of the current picture is referred to as an inter-layer reference picture (ILRP).

Figure 5:
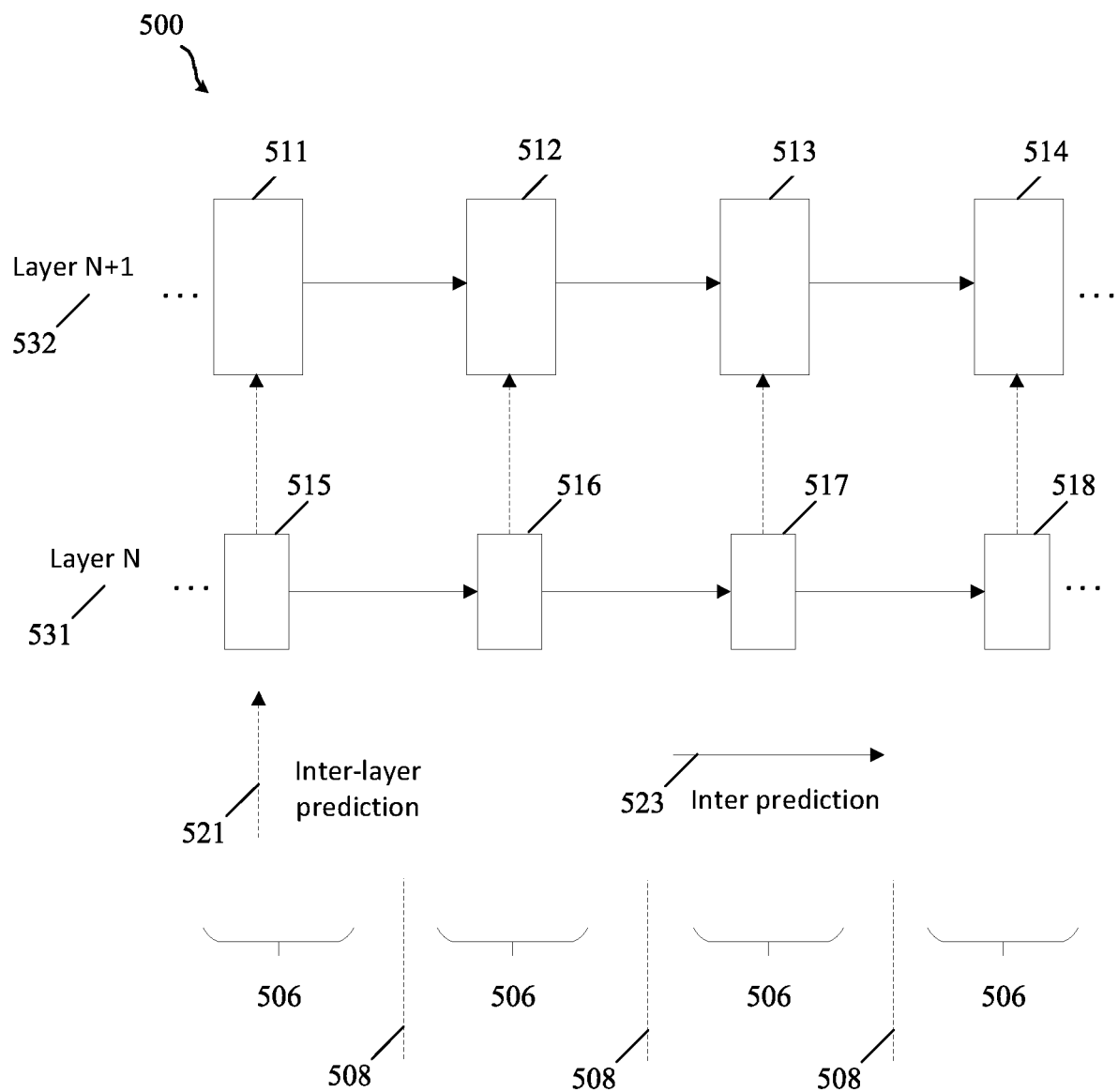
FIG. 5 illustrates an example of multi-layer coding for spatial scalability.

FIG. 5 is a schematic diagram illustrating an example of layer based prediction 500, for example as performed to determine MVs at block compression step 105, block decoding step 113, motion estimation component 221, motion compensation component 219, motion compensation component 321, and/or motion compensation component 421. Layer based prediction 500 is compatible with unidirectional inter-prediction and/or bidirectional inter-prediction, but is also performed between pictures in different layers.

Layer based prediction 500 is applied between pictures 511, 512, 513, and 514 and pictures 515, 516, 517, and 518 in different layers. In the example shown, pictures 511, 512, 513, and 514 are part of layer N+1 532 and pictures 515, 516, 517, and 518 are part of layer N 531. A layer, such as layer N 531 and/or layer N+1 532, is a group of pictures that are all associated with a similar value of a characteristic, such as a similar size, quality, resolution, signal to noise ratio, capability, etc. In the example shown, layer N+1 532 is associated with a larger image size than layer N 531. Accordingly, pictures 511, 512, 513, and 514 in layer N+1 532 have a larger picture size (e.g., larger height and width and hence more samples) than pictures 515, 516, 517, and 518 in layer N 531 in this example. However, such pictures can be separated between layer N+1 532 and layer N 531 by other characteristics. While only two layers, layer N+1 532 and layer N 531, are shown, a set of pictures can be separated into any number of layers based on associated characteristics. Layer N+1 532 and layer N 531 may also be denoted by a layer ID. A layer ID is an item of data that is associated with a picture and denotes the picture is part of an indicated layer. Accordingly, each picture 511-518 may be associated with a corresponding layer ID to indicate which layer N+1 532 or layer N 531 includes the corresponding picture.

Pictures 511-518 in different layers 531-532 are configured to be displayed in the alternative. As such, pictures 511-518 in different layers 531-532 can share the same temporal identifier (ID) and can be included in the same AU. As used herein, an AU is a set of one or more coded pictures associated with the same display time for output from a DPB. For example, a decoder may decode and display picture 515 at a current display time if a smaller picture is desired or the decoder may decode and display picture 511 at the current display time if a larger picture is desired. As such, pictures 511-514 at higher layer N+1 532 contain substantially the same image data as corresponding pictures 515-518 at lower layer N 531 (notwithstanding the difference in picture size). Specifically, picture 511 contains substantially the same image data as picture 515, picture 512 contains substantially the same image data as picture 516, etc.

Pictures 511-518 can be coded by reference to other pictures 511-518 in the same layer N 531 or N+1 532. Coding a picture in reference to another picture in the same layer results in inter-prediction 523, which is compatible unidirectional inter-prediction and/or bidirectional inter-prediction. Inter-prediction 523 is depicted by solid line arrows. For example, picture 513 may be coded by employing inter-prediction 523 using one or two of pictures 511, 512, and/or 514 in layer N+1 532 as a reference, where one picture is referenced for unidirectional inter-prediction and/or two pictures are reference for bidirectional inter-prediction. Further, picture 517 may be coded by employing inter-prediction 523 using one or two of pictures 515, 516, and/or 518 in layer N 531 as a reference, where one picture is referenced for unidirectional inter-prediction and/or two pictures are reference for bidirectional inter-prediction. When a picture is used as a reference for another picture in the same layer when performing inter-prediction 523, the picture may be referred to as a reference picture. For example, picture 512 may be a reference picture used to code picture 513 according to inter-prediction 523. Inter-prediction 523 can also be referred to as intra-layer prediction in a multi-layer context. As such, inter-prediction 523 is a mechanism of coding samples of a current picture by reference to indicated samples in a reference picture that are different from the current picture where the reference picture and the current picture are in the same layer.

Pictures 511-518 can also be coded by reference to other pictures 511-518 in different layers. This process is known as inter-layer prediction 521, and is depicted by dashed arrows. Inter-layer prediction 521 is a mechanism of coding samples of a current picture by reference to indicated samples in a reference picture where the current picture and the reference picture are in different layers and hence have different layer IDs. For example, a picture in a lower layer N 531 can be used as a reference picture to code a corresponding picture at a higher layer N+1 532. As a specific example, picture 511 can be coded by reference to picture 515 according to inter-layer prediction 521. In such a case, the picture 515 is used as an inter-layer reference picture. An inter-layer reference picture is a reference picture used for inter-layer prediction 521. In most cases, inter-layer prediction 521 is constrained such that a current picture, such as picture 511, can only use inter-layer reference picture(s) that are included in the same AU and that are at a lower layer, such as picture 515. When multiple layers (e.g., more than two) are available, inter-layer prediction 521 can encode/decode a current picture based on multiple inter-layer reference picture(s) at lower levels than the current picture.

A video encoder can employ layer based prediction 500 to encode pictures 511-518 via many different combinations and/or permutations of inter-prediction 523 and inter-layer prediction 521. For example, picture 515 may be coded according to intra-prediction. Pictures 516-518 can then be coded according to inter-prediction 523 by using picture 515 as a reference picture. Further, picture 511 may be coded according to inter-layer prediction 521 by using picture 515 as an inter-layer reference picture. Pictures 512-514 can then be coded according to inter-prediction 523 by using picture 511 as a reference picture. As such, a reference picture can serve as both a single layer reference picture and an inter-layer reference picture for different coding mechanisms. By coding higher layer N+1 532 pictures based on lower layer N 531 pictures, the higher layer N+1 532 can avoid employing intra-prediction, which has much lower coding efficiency than inter-prediction 523 and inter-layer prediction 521. As such, the poor coding efficiency of intra-prediction can be limited to the smallest/lowest quality pictures, and hence limited to coding the smallest amount of video data. The pictures used as reference pictures and/or inter-layer reference pictures can be indicated in entries of reference picture list(s) contained in a reference picture list structure.

Each AU 506 in FIG. 5 may contain several pictures. For example, one AU 506 may contain pictures 511 and 515. Another AU 506 may contain pictures 512 and 516. Indeed, each AU 506 is a set of one or more coded pictures associated with the same display time (e.g., the same temporal ID) for output from a decoded picture buffer (DPB) (e.g., for display to a user). Each AUD 508 is an indicator or data structure used to indicate the start of an AU (e.g., AU 508) or the boundary between AUs.

Previous H.26x video coding families have provided support for scalability in separate profile(s) from the profile(s) for single-layer coding. Scalable video coding (SVC) is the scalable extension of the AVC/H.264 that provides support for spatial, temporal, and quality scalabilities. For SVC, a flag is signaled in each macroblock (MB) in EL pictures to indicate whether the EL MB is predicted using the collocated block from a lower layer. The prediction from the collocated block may include texture, motion vectors, and/or coding modes. Implementations of SVC cannot directly reuse unmodified H.264/AVC implementations in their design. The SVC EL macroblock syntax and decoding process differs from H.264/AVC syntax and decoding process.

Scalable HEVC (SHVC) is the extension of the HEVC/H.265 standard that provides support for spatial and quality scalabilities, multiview HEVC (MV-HEVC) is the extension of the HEVC/H.265 that provides support for multi-view scalability, and 3D HEVC (3D-HEVC) is the extension of the HEVC/H.264 that provides supports for three dimensional (3D) video coding that is more advanced and more efficient than MV-HEVC. Note that the temporal scalability is included as an integral part of the single-layer HEVC codec. The design of the multi-layer extension of HEVC employs the idea where the decoded pictures used for inter-layer prediction come only from the same access unit (AU) and are treated as long-term reference pictures (LTRPs), and are assigned reference indices in the reference picture list(s) along with other temporal reference pictures in the current layer. Inter-layer prediction (ILP) is achieved at the prediction unit (PU) level by setting the value of the reference index to refer to the inter-layer reference picture(s) in the reference picture list(s).

Notably, both reference picture resampling and spatial scalability features call for resampling of a reference picture or part thereof. Reference picture resampling (RPR) can be realized at either the picture level or coding block level. However, when RPR is referred to as a coding feature, it is a feature for single-layer coding. Even so, it is possible or even preferable from a codec design point of view to use the same resampling filter for both the RPR feature of single-layer coding and the spatial scalability feature for multi-layer coding.

Figure 6:
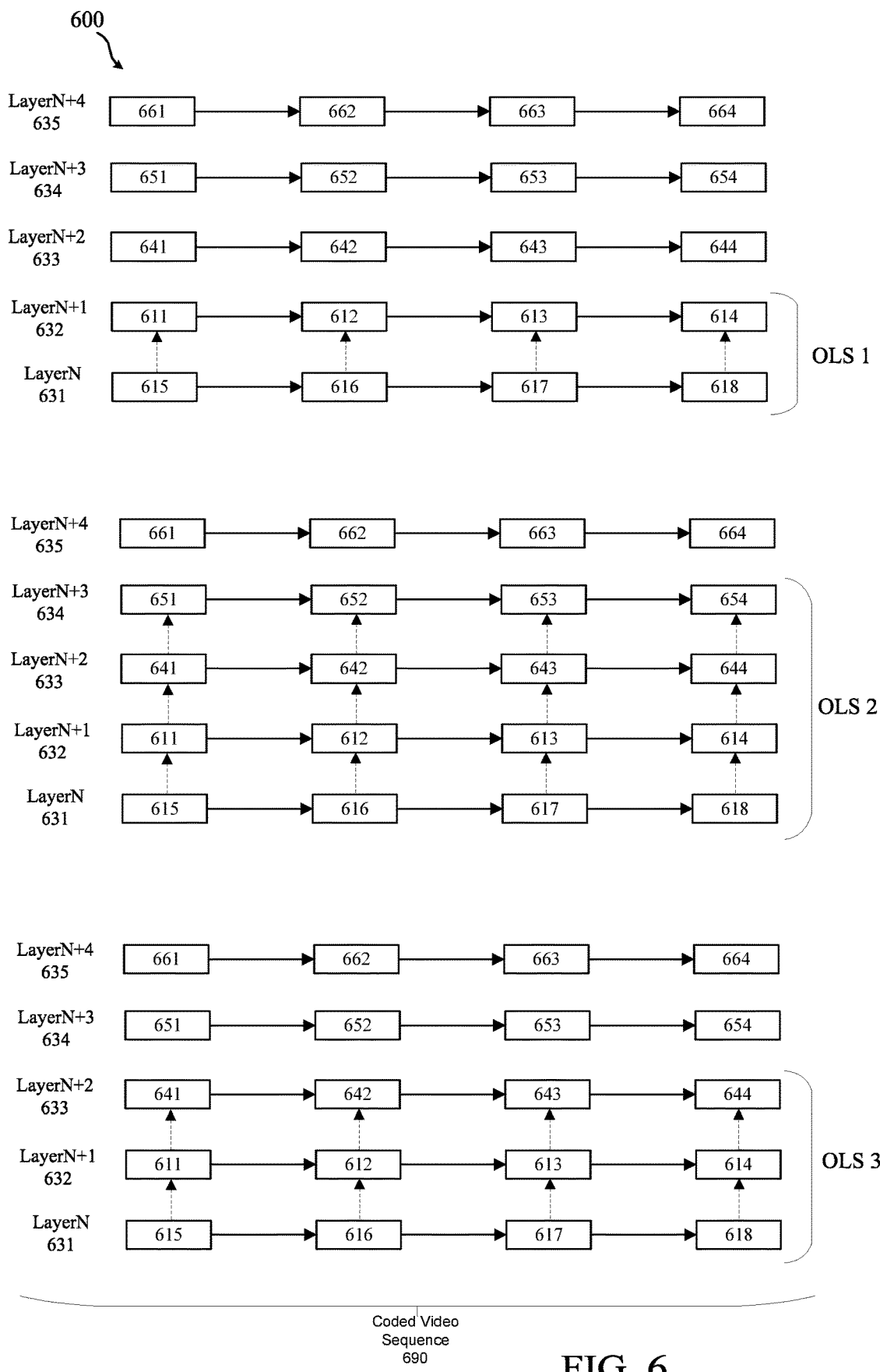
FIG. 6 illustrates an example of multi-layer coding using output layer sets (OLSs).

FIG. 6 illustrates an example of layer based prediction 600 utilizing output layer sets (OLSs), for example as performed to determine MVs at block compression step 105, block decoding step 113, motion estimation component 221, motion compensation component 219, motion compensation component 321, and/or motion compensation component 421. Layer based prediction 600 is compatible with unidirectional inter-prediction and/or bidirectional inter-prediction, but is also performed between pictures in different layers. The layer based prediction of FIG. 6 is similar to that of FIG. 5. Therefore, for the sake of brevity, a full description of layer based prediction is not repeated.

Some of the layers in the coded video sequence (CVS) 690 of FIG. 6 are included in an OLS. An OLS is a set of layers for which one or more layers are specified as the output layers. An output layer is a layer of an OLS that is output. FIG. 6 depicts three different OLSs, namely OLS 1, OLS 2, and OLS 3. As shown, OLS 1 includes Layer N 631 and Layer N+1 632. OLS 2 includes Layer N 631, Layer N+1 632, Layer N+2 633, and Layer N+1 634. OLS 3 includes Layer N 631, Layer N+1 632, and Layer N+2 633. Despite three OLSs being shown, a different number of OLSs may be used in practical applications.

Each of the different OLSs may contain any number of layers. The different OLSs are generated in an effort to accommodate the coding capabilities of a variety of different devices having varying coding capabilities. For example, OLS 1, which contains only two layers, may be generated to accommodate a mobile phone with relatively limited coding capabilities. On the other hand, OLS 2, which contains four layers, may be generated to accommodate a big screen television, which is able to decode higher layers than the mobile phone. OLS 3, which contains three layers, may be generated to accommodate a personal computer, laptop computer, or a tablet computer, which may be able to decode higher layers than the mobile phone but cannot decode the highest layers like the big screen television.

The layers in FIG. 6 can be all independent from each other. That is, each layer can be coded without using inter-layer prediction (ILP). In this case, the layers are referred to as simulcast layers. One or more of the layers in FIG. 6 may also be coded using ILP. Whether the layers are simulcast layers or whether some of the layers are coded using ILP is signaled by a flag in a video parameter set (VPS), which will be more fully discussed below. When some layers use ILP, the layer dependency relationship among layers is also signaled in the VPS.

In an embodiment, when the layers are simulcast layers, only one layer is selected for decoding and output. In an embodiment, when some layers use ILP, all of the layers (e.g., the entire bitstream) are specified to be decoded, and certain layers among the layers are specified to be output layers. The output layer or layers may be, for example, 1) only the highest layer, 2) all the layers, or 3) the highest layer plus a set of indicated lower layers. For example, when the highest layer plus a set of indicated lower layers are designated for output by a flag in the VPS, layer N+3 634 (which is the highest layer) and layers N 631 and N+1 632 (which are lower layers) from OLS 2 are output.

Figure 7:
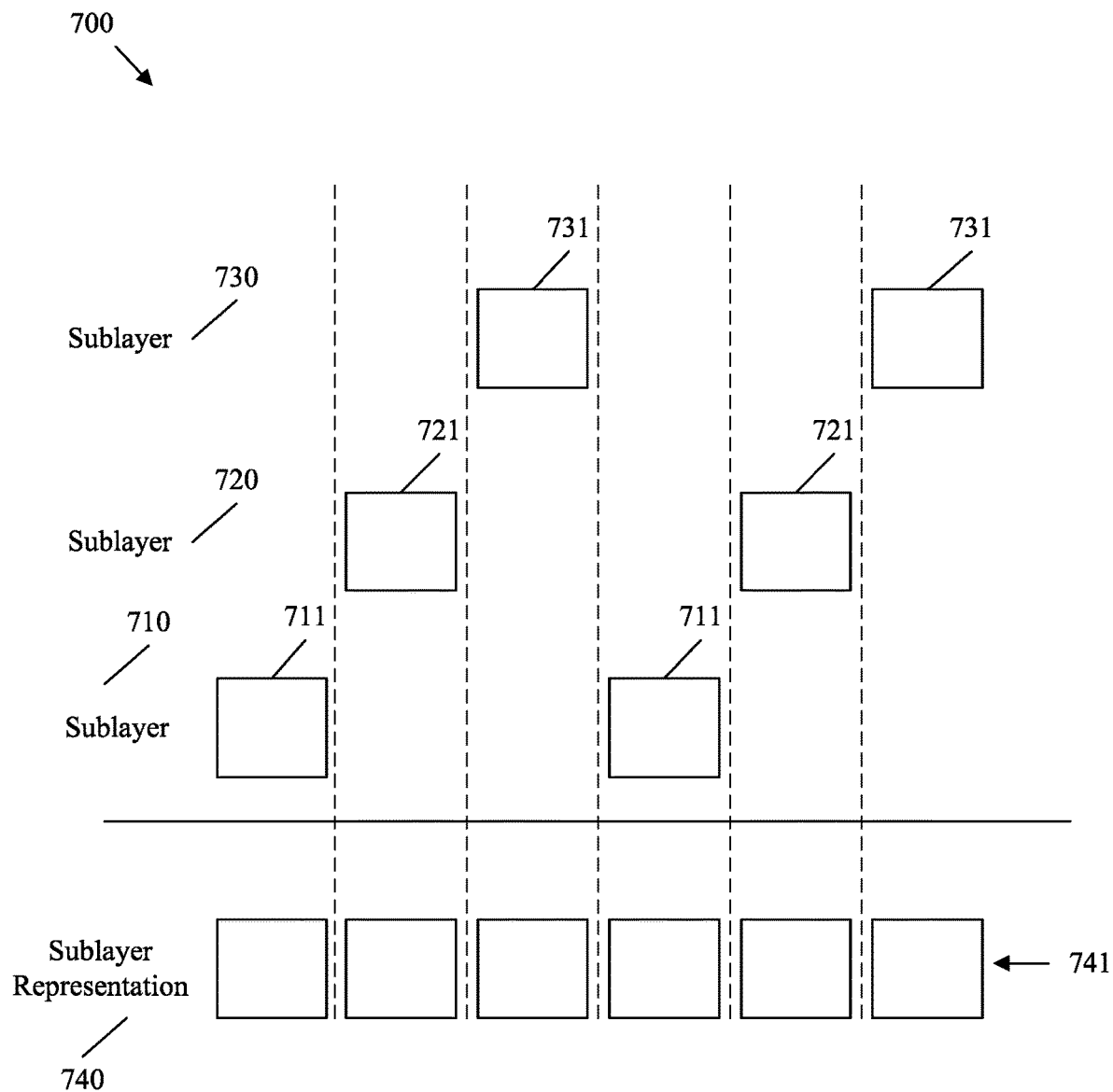
FIG. 7 illustrates an example multi-layer video sequence configured for temporal scalability.

FIG. 7 is a schematic diagram illustrating an example multi-layer video sequence 700 configured for temporal scalability. The multi-layer video sequence 700 may be encoded by an encoder, such as codec system 200 and/or encoder 300 and decoded by a decoder, such as codec system 200 and/or decoder 400, for example according to method 100. The multi-layer video sequence 700 is included to depict another example application for layers in a coded video sequence. For example, the multi-layer video sequence 700 may be employed as a separate embodiment or may be combined with the techniques described with respect to the multi-layer video sequence 500 or 600.

The multi-layer video sequence 700 includes sublayers 710, 720, and 730. A sublayer is a temporal scalable layer of a temporal scalable bitstream that includes VCL NAL units (e.g., pictures) with a particular temporal identifier value as well as associated non-VCL NAL units (e.g., supporting parameters). The sublayer 710 may be referred to as a base layer and sublayers 720 and 730 may be referred to as enhancement layers. As shown, the sublayer 710 includes pictures 711 at a first frame rate, such as thirty frames per second. The sublayer 710 is a base layer because the sublayer 710 includes the base/lowest frame rate. The sublayer 720 contains pictures 721 that are temporally offset from the pictures 711 of sublayer 710. The result is that sublayer 710 and sublayer 720 can be combined, which results in a frame rate that is collectively higher than the frame rate of the sublayer 710 alone. For example, sublayer 710 and 720 may have a combined frame rate of sixty frames per second. Accordingly, the sublayer 720 enhances the frame rate of the sublayer 710. Further, sublayer 730 contains pictures 731 that are also temporally offset from the pictures 721 and 711 of sublayers 720 and 710. As such, the sublayer 730 can be combined with sublayers 720 and 710 to further enhance the sublayer 710. For example, the sublayers 710, 720, and 730 may have a combined frame rate of ninety frames per second.

A sublayer representation 740 can be dynamically created by combining sublayers 710, 720, and/or 730. A sublayer representation 740 is a subset of a bitstream containing NAL units of a particular sublayer and the lower sublayers. In the example shown, the sublayer representation 740 contains pictures 741, which are the combined pictures 711, 721, and 731 of sublayers 710, 720, and 730. Accordingly, the multi-layer video sequence 700 can be temporally scaled to a desired frame rate by selecting a sublayer representation 740 that includes a desired set of sublayers 710, 720, and/or 730. A sublayer representation 740 may be created by employing an OLS that includes sublayer 710, 720, and/or 730 as layers. In such a case, the sublayer representation 740 is selected as an output layer. As such, temporal scalability is one of several mechanisms that can be accomplished using multi-layer mechanisms.

Video coding standards like HEVC, SHVC, MV-HEVC, and VVC specify and signal a profile, a tier, and a level. Profiles, tiers, and levels specify restrictions on bitstreams and hence limits on the capabilities needed to decode the bitstreams. Profiles, tiers and levels may also be used to indicate interoperability points between individual decoder implementations. A profile is a defined set of coding tools used to create a compliant or conforming bitstream. Each profile specifies a subset of algorithmic features and limits that shall be supported by all decoders conforming to that profile.

A level is a set of constraints for a bitstream (e.g., max luma sample rate, max bit rate for a resolution, etc.). That is, a level is a set of constraints that indicate the required decoder performance to playback a bitstream of the specified profile.

The levels are split into two tiers: Main and High. The Main tier is a lower tier than the High tier. The tiers were made to deal with applications that differ in terms of their maximum bit rate. The Main tier was designed for most applications while the High tier was designed for very demanding applications. The set of constraints and/or tiers corresponding to the levels may be referred to herein as level information.

Each level of a tier specifies a set of limits on the values that may be taken by the syntax elements of a particular standard (e.g., HEVC, VVC). The same set of tier and level definitions is used with all profiles, but individual implementations may support a different tier and within a tier a different level for each supported profile. For any given profile, a level of a tier generally corresponds to a particular decoder processing load and memory capability.

Using the HEVC standard, a representative example of levels and tiers for different profiles is provided in Table 1 below.

TABLE 1

| Level | Max bit rate for Main 4:4:4 12 profile (1000 bits/sec) | | Max bit rate for High Throughput 4:4:4 16 Intra profile (1000 bits/sec) | | Example picture resolution at highest frame rate (MaxDPBsize) |
|---|---|---|---|---|---|
| | Main tier | High tier | Main tier | High tier | |
| 5.2 | 180,000 | 720,000 | 5,760,000 | 23,040,000 | 4,096 × 2,160@120.0 |
| 6 | 180,000 | 720,000 | 5,760,000 | 23,040,000 | 8,192 × 4,320@30.0 |
| 6.1 | 180,000 | 720,000 | 11,520,000 | 46,080,000 | 8,192 × 4,320@60.0 |
| 6.2 | 720,000 | 2,400,000 | 23,040,000 | 76,800,000 | 8,192 × 4,320@120.0 |

Decoded picture buffer (DPB) parameters are a syntax structure that provides a DPB size and, optionally, a maximum picture reorder number and maximum latency information. The maximum picture reorder number and maximum latency information may be collectively referred to by the acronym MRML. In an embodiment, one or more of the levels as noted in the table above are signaled along with the DPB parameters.

In an embodiment, the maximum picture reorder number is designated dpb_max_num_reorder_pics[i], which specifies the maximum allowed number of pictures of the OLS that can precede any picture in the OLS in decoding order and follow that picture in output order when Htid is equal to i. The value of dpb_max_num_reorder_pics[i] shall be in the range of 0 to dpb_max_dec_pic_buffering_minus1[i], inclusive. When i is greater than 0, dpb_max_num_reorder_pics[i] shall be greater than or equal to dpb_max_num_reorder_pics[i−1]. When dpb_max_num_reorder_pics[i] is not present for i in the range of 0 to MaxSubLayersMinus1−1, inclusive, due to subLayerInfoFlag being equal to 0, it is inferred to be equal to dpb_max_num_reorder_pics[MaxSubLayersMinus1]. Htid is a variable which identifies the highest temporal sublayer to be decoded.

dpb_max_dec_pic_buffering_minus1[i] plus 1 specifies the maximum required size of the DPB in units of picture storage buffers when Htid is equal to i. The value of dpb_max_dec_pic_buffering_minus1[i] shall be in the range of 0 to MaxDpbSize−1, inclusive, where MaxDpbSize is as specified in subclause A.4.2 of the VVC standard. When i is greater than 0, dpb_max_dec_pic_buffering_minus1[i] shall be greater than or equal to dpb_max_dec_pic_buffering_minus1[i−1]. When dpb_max_dec_pic_buffering_minus1[i] is not present for i in the range of 0 to MaxSubLayersMinus1−1, inclusive, due to subLayerInfoFlag being equal to 0, it is inferred to be equal to dpb_max_dec_pic_buffering_minus1[MaxSubLayersMinus1].

In an embodiment, maximum latency information is designated dpb_max_latency_increase_plus1[i]. dpb_max_latency_increase_plus1[i] not equal to 0 is used to compute the value of MaxLatencyPictures[i], which specifies the maximum number of pictures in the OLS that can precede any picture in the OLS in output order and follow that picture in decoding order when Htid is equal to i.

MaxLatencyPictures[i]=dpb_max_num_reorder_pics[i]+dpb_max_latency_increase_plus1[i]−1.

When OLSs are specified, e.g., as in SHVC and MV-HEVC, any particular layer may be included in multiple OLSs. A particular layer may be an output layer in some OLSs and at the same time may be a non-output layer in some other OLSs. Given a layer, the main difference between the layer being an output layer and being a non-output layer is the DPB size. Thus, there are only two options for DPB available. That is, a third DPB size for a layer is not possible. Therefore, signaling at most two DPB sizes for any particular layer is sufficient. However, signaling a DPB size for a particular layer each time that layer is included in an OLS is unnecessary and can waste bits when there are more than three OLSs.

In SHVC and MV-HEVC, the DPB size is specified and signaled for each layer (e.g., layers N 631 and N+1 632) or each sublayer included in an OLS (e.g., OLS 1). Using FIG. 6 as an example, a DPB size is signaled for layers N 631 and N+1 632 because those layers are included in OLS 1. The DPB size is also signaled for layers N 631, N+1 632, N+2 633, and N+3 634 because those layers are included in OLS 2. In addition, the DPB size is signaled for layers N 631, N+1 632, and N+2 633 because those layers are included in OLS 3. Therefore, the DPB size corresponding to layer N 631 ends up being signaled three times because that layer is included in all three of the OLSs, namely OLS 1, OLS 2, and OLS 3. Likewise, the DPB size corresponding to layer N+1 632 also ends up being signaled three times because that layer is included in all three of the OLSs, namely OLS 1, OLS 2, and OLS 3. Finally, the DPB size corresponding to layer N+2 633 ends up being signaled twice because that layer is included in two of the OLSs, namely OLS 1 and OLS 2. Such repeated signaling of the same DPB size (or DBP parameters) is redundant and leads to coding inefficiency.

Disclosed herein are techniques that utilize a flag to specify whether each of the plurality of layers or sublayers referring to a sequence parameter set (SPS) has a same set of (DPB) parameters and/or level information regardless of whether each of the plurality of layers or sublayers is an output layer or a non-output layer or whether each of the plurality of layers or sublayers referring to the SPS has one set of DPB parameters that apply to output layers and another set of DPB parameters that apply to non-output layers. By using the flag, the same DPB parameters are not repeatedly signaled for the same layer or sublayer in some circumstances, which reduces redundancy and increases coding efficiency for multi-layer video bitstreams. Thus, the coder/decoder (a.k.a., "codec") in video coding is improved relative to current codecs. As a practical matter, the improved video coding process offers the user a better user experience when videos are sent, received, and/or viewed.

Figure 8:
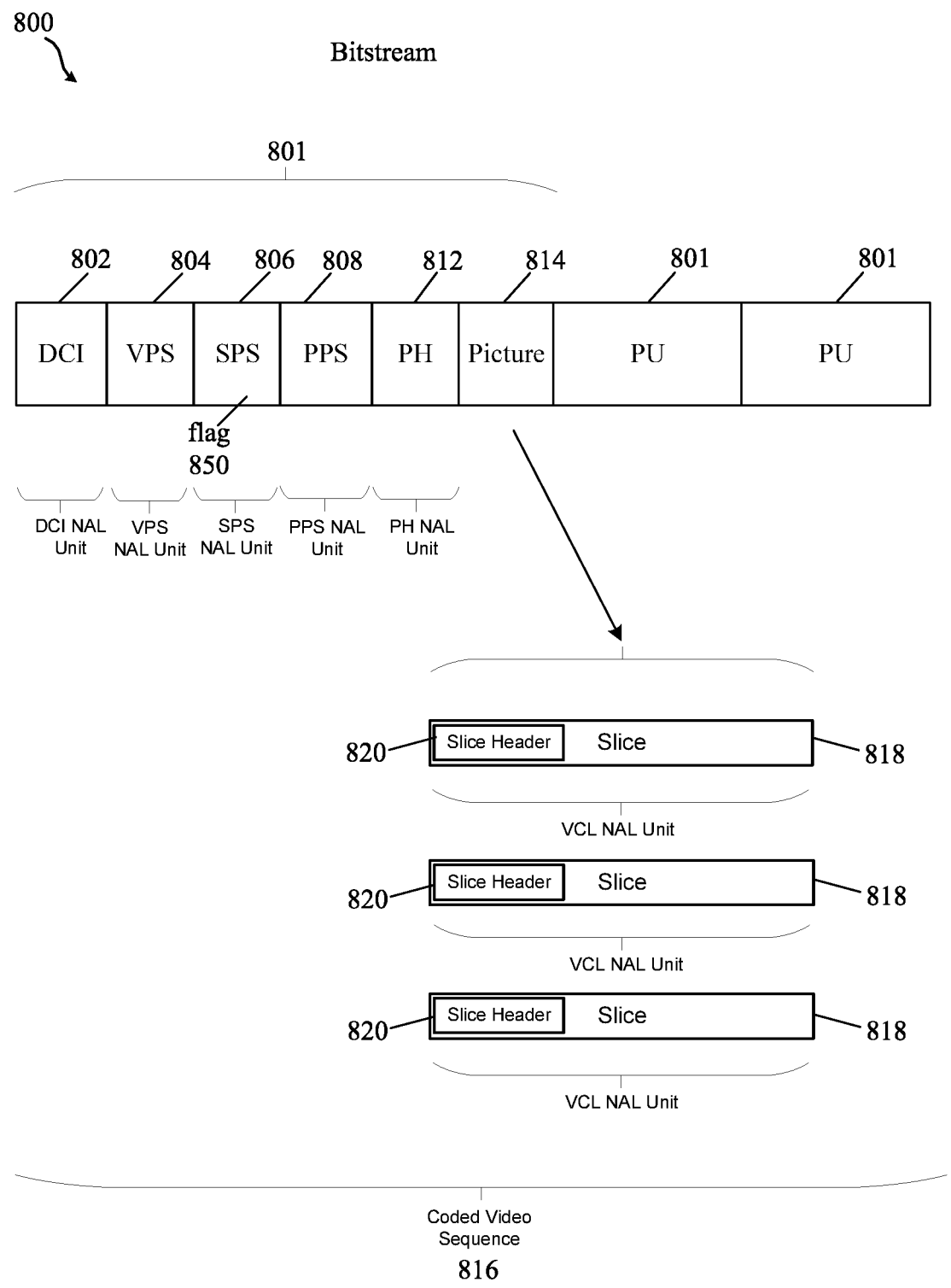
FIG. 8 illustrates an embodiment of a video bitstream.

FIG. 8 illustrates an embodiment of a video bitstream 800. As used herein the video bitstream 800 may also be referred to as a coded video bitstream, a bitstream, or variations thereof. As shown in FIG. 8, the bitstream 800 comprises at least one picture unit (PU) 801. While three of the PUs 801 are shown in FIG. 8, a different number of PUs 801 may be present in the bitstream 800 in practical applications. Each PU 801 is a set of NAL units that are associated with each other according to a specified classification rule, are consecutive in decoding order, and contain exactly one coded picture (e.g., picture 814).

In an embodiment, each PU 801 contains one or more of the following: decoding capability information (DCI) 802, a video parameter set (VPS) 804, a sequence parameter set (SPS) 806, a picture parameter set (PPS) 808, a picture header (PH) 812, and a picture 814. Each of the DCI 802, the VPS 804, the SPS 806, and the PPS 808 may be generically referred to as a parameter set. In an embodiment, other parameter sets not shown in FIG. 8 may also be included in the bitstream 800 such as, for example, an adaption parameter set (APS), which is a syntax structure containing syntax elements that apply to zero or more slices as determined by zero or more syntax elements found in slice headers.

The DCI 802, which may also be referred to a decoding parameter set (DPS) or decoder parameter set, is a syntax structure containing syntax elements that apply to the entire bitstream. The DCI 802 includes parameters that stay constant for the lifetime of the video bitstream (e.g., bitstream 800), which can translate to the lifetime of a session. The DCI 802 can include profile, level, and sub-profile information to determine a maximum complexity interop point that is guaranteed to be never exceeded, even if splicing of video sequences occurs within a session. It further optionally includes constraint flags, which indicate that the video bitstream will be constraint of the use of certain features as indicated by the values of those flags. With this, a bitstream can be labelled as not using certain tools, which allows among other things for resource allocation in a decoder implementation. Like all parameter sets, the DCI 802 is present when first referenced, and referenced by the very first picture in a video sequence, implying that it has to be sent among the first NAL units in the bitstream. While multiple DCIs 802 can be in the bitstream, the value of the syntax elements therein cannot be inconsistent when being referenced.

The VPS 804 includes decoding dependency or information for reference picture set construction of enhancement layers. The VPS 804 provides an overall perspective or view of a scalable sequence, including what types of operation points are provided, the profile, tier, and level of the operation points, and some other high-level properties of the bitstream that can be used as the basis for session negotiation and content selection, etc.

In an embodiment, when it is indicated that some of the layers use ILP, the VPS 804 indicates that a total number of OLSs specified by the VPS is equal to the number of layers, indicates that the i-th OLS includes the layers with layer indices from 0 to i, inclusive, and indicates that for each OLS only the highest layer in the OLS is output.

The SPS 806 contains data that is common to all the pictures in a sequence of pictures (SOP). The SPS 806 is a syntax structure containing syntax elements that apply to zero or more entire CLVSs as determined by the content of a syntax element found in the PPS referred to by a syntax element found in each picture header. In contrast, the PPS 808 contains data that is common to the entire picture. The PPS 808 is a syntax structure containing syntax elements that apply to zero or more entire coded pictures as determined by a syntax element found in each picture header (e.g., PH 812).

In an embodiment, the SPS 806 includes a flag 850. The flag 850 may be set by the encoder to have a first value (e.g., one) or a second value (e.g., zero). When the flag 850 has the first value, each of the plurality of layers (e.g., layers 631, 632, etc.) or sublayers (e.g., sublayers 710, 720, etc.) referring to the SPS 806 has a same set of DPB parameters regardless of whether each of the plurality of layers is an output layer or a non-output layer. That is, all of the layers or sublayers referring to the SPS 806 share the same set of DPB parameters.

When the flag 850 has the second value, each of the plurality of (e.g., layers 631, 632, etc.) or sublayers (e.g., sublayers 710, 720, etc.) referring to the SPS 806 has a first set of DPB parameters that apply to output layers and a second set of DPB parameters that apply to non-output layers. That is, the output layers share one set of DPB parameters and the non-output layers share another set of DPB parameters. As such, the output layers rely on a separate and/or different set of DPB parameters than the non-output layers.

By setting the flag 850 accordingly, an encoder can avoid having to repeatedly signal the same set of DPB parameters in some circumstances (e.g., when using the same DPB parameters for both output layers and for non-output layers is sufficient). Moreover, the decoder can avoid repeatedly receiving and having to process the same set of DPB parameters in some circumstances.

In an embodiment, the flag 850 is designated as a same_nonoutput_level_and_dpb_size_flag. In an embodiment, more than one flag may be used to instead of flag 850. For example, instead of using flag 850 to signal the all of the DPB parameters, one flag can be used to signal a level for the layers or sublayers and another flag can be used to signal a DPB size for the layers or sublayers. That is, two or more flags can be used as an alternative to the flag 850.

In an embodiment, the VPS 804 and/or the SPS 806 contain the following SPS syntax and semantics to implement one or more of the embodiments disclosed herein.

|  | Descriptor |
|---|---|
| seq_parameter_set_rbsp( ) { |  |
|   sps_decoding_parameter_set_id | u(4) |
|   sps_video_parameter_set_id | u(4) |
|   sps_max_sub_layers_minus1 | u(3) |
|   sps_reserved_zero_4bits | u(4) |
|   same_nonoutput_level_and_dpb_size_flag | u(1) |
|   ... |  |
|   if( sps_max_sub_layers_minus1 > 0 ) |  |
|     sps_sub_layer_ordering_info_present_flag | u(1) |
|   dpb_parameters( 1 ) |  |
|   if( !same_nonoutput_level_and_dpb_size_flag ) |  |
|     dpb_parameters( 0 ) |  |
|   ... |  |
| } |  |

The SPS semantics include the following.

An SPS RBSP shall be available to the decoding process prior to it being referenced, included in at least one access unit with TemporalId equal to 0 or provided through external means, and the SPS NAL unit containing the SPS RBSP shall have nuh_layer_id equal to the lowest nuh_layer_id value of PPS NAL units that refer to it.

All SPS NAL units with a particular value of sps_seq_parameter_set_id in a CVS shall have the same content.

sps_decoding_parameter_set_id, when greater than 0, specifies the value of dps_decoding_parameter_set_id for the DPS referred to by the SPS. When sps_decoding_parameter_set_id is equal to 0, the SPS does not refer to a DPS and no DPS is referred to when decoding each CLVS referring to the SPS. The value of sps_decoding_parameter_set_id shall be the same in all SPSs that are referred to by coded pictures in a bitstream.

sps_video_parameter_set_id, when greater than 0, specifies the value of vps_video_parameter_set_id for the VPS referred to by the SPS. When sps_video_parameter_set_id is equal to 0, the SPS does not refer to a VPS and no VPS is referred to when decoding each CLVS referring to the SPS.

sps_max_sub_layers_minus1 plus 1 specifies the maximum number of temporal sublayers that may be present in each CLVS referring to the SPS. The value of sps_max_sub_layers_minus1 shall be in the range of 0 to vps_max_sub_layers_minus1, inclusive.

sps_reserved_zero_4bits shall be equal to 0 in bitstreams conforming to this version of this Specification. Other values for sps_reserved_zero_4bits are reserved for future use by ITU-T ISO/IEC.

same_nonoutput_level_and_dpb_size_flag equal to 1 specifies that the same set of level and DPB size parameters applies to each layer referring to the SPS regardless of whether the layer is an output layer. same_nonoutput_level_and_dpb_size_flag equal to 0 specifies that two separate sets of level and DPB size parameters apply to each layer referring to the SPS depending on whether the layer is an output layer.

Alternatively, two separate flags, are used, one specifies whether the same set of level parameters applies to each layer referring to the SPS regardless of whether the layer is an output layer, and the other specifies whether the same set of DPB size parameters applies to each layer referring to the SPS regardless of whether the layer is an output layer.

In an embodiment, the VPS 804 and/or the SPS 806 contain the following DPB syntax and semantics to implement one or more of the embodiments disclosed herein.

The DPB syntax includes the following.

|  | Descriptor |
|---|---|
| dpb_parameters( reorderMaxLatencyPresentFlag ) { |  |
|   for( i = ( sps_sub_layer_ordering_info_present_flag ? 0 : sps_max_sub_layers_minus1 ); |  |
|     i <= sps_max_sub_layers_minus1; i++ ) { |  |
|     sps_max_dec_pic_buffering_minus1[ i ] | ue(v) |
|     if( reorderMaxLatencyPresentFlag ) { |  |
|       sps_max_num_reorder_pics[ i ] | ue(v) |
|       sps_max_latency_increase_plus1[ i ] | ue(v) |
|     } |  |
|   } |  |
| } |  |

The DPB semantics include the following.

The dpb_parameters( ) syntax structure provides DPB size information, and, optionally, maximum picture reorder number and maximum latency information (denoted as MRML information).

Each SPS includes one or more dpb_parameters( ) syntax structures. The first dpb_parameters( ) syntax structure in an SPS contains both DPB size information and MRML information. When present, the second dpb_parameters( ) syntax structure in an SPS contains DPB size information only. The MRML information in the first dpb_parameters( ) syntax structure in an SPS applies to a layer referring to the SPS regardless of whether the layer is an output layer in an OLS. The DPB size information in the first dpb_parameters( ) syntax structure in an SPS applies to a layer referring to the SPS when the layer is an output layer of an OLS. The DPB size information included in the second dpb_parameters( ) syntax structure, when present, in an SPS applies to a layer referring to the SPS when the layer is a non-output layer of an OLS. When an SPS includes only one dpb_parameters( ) syntax structure, the DPB size information for the layer as a non-output layer is inferred to be the same as that for the layer as an output layer.

sps_max_dec_pic_buffering_minus1[i] plus 1 specifies the maximum required size of the decoded picture buffer for the CLVS in units of picture storage buffers when Htid is equal to i. The value of sps_max_dec_pic_buffering_minus1[i] shall be in the range of 0 to MaxDpbSize−1, inclusive, where MaxDpbSize is as specified somewhere else. When i is greater than 0, sps_max_dec_pic_buffering_minus1[i]

shall be greater than or equal to sps_max_dec_pic_buffering_minus1[i−1]. When sps_max_dec_pic_buffering_minus1[i] is not present for i in the range of 0 to sps_max_sub_layers_minus1−1, inclusive, due to sps_sub_layer_ordering_info_present_flag being equal to 0, it is inferred to be equal to sps_max_dec_pic_buffering_minus1[sps_max_sub_layers_minus1].

sps_max_num_reorder_pics[i] indicates the maximum allowed number of pictures that can precede any picture in the CLVS in decoding order and follow that picture in output order when Htid is equal to i. The value of sps_max_num_reorder_pics[i] shall be in the range of 0 to sps_max_dec_pic_buffering_minus1[i], inclusive. When i is greater than 0, sps_max_num_reorder_pics[i] shall be greater than or equal to sps_max_num_reorder_pics[i−1]. When sps_max_num_reorder_pics[i] is not present for i in the range of 0 to sps_max_sub_layers_minus1−1, inclusive, due to sps_sub_layer_ordering_info_present_flag being equal to 0, it is inferred to be equal to sps_max_num_reorder_pics[sps_max_sub_layers_minus1].

sps_max_latency_increase_plus1[i] not equal to 0 is used to compute the value of SpsMaxLatencyPictures[i], which specifies the maximum number of pictures that can precede any picture in the CLVS in output order and follow that picture in decoding order when Htid is equal to i.

When sps_max_latency_increase_plus1[i] is not equal to 0, the value of SpsMaxLatencyPictures[i] is specified as follows.

$$\text{SpsMaxLatencyPictures}[i] = \text{sps\_max\_num\_reorder\_pics}[i] + \text{sps\_max\_latency\_increase\_plus1}[i] - 1 \quad (7\text{-}14)$$

When sps_max_latency_increase_plus1[i] is equal to 0, no corresponding limit is expressed.

The value of sps_max_latency_increase_plus1[i] shall be in the range of 0 to $2^{32}-2$, inclusive. When sps_max_latency_increase_plus1[i] is not present for i in the range of 0 to sps_max_sub_layers_minus1−1, inclusive, due to sps_sub_layer_ordering_info_present_flag being equal to 0, it is inferred to be equal to sps_max_latency_increase_plus1[sps_max_sub_layers_minus1].

The DCI 802, the VPS 804, the SPS 806, and the PPS 808 are contained in different types of Network Abstraction Layer (NAL) units. A NAL unit is a syntax structure containing an indication of the type of data to follow (e.g., coded video data). NAL units are classified into video coding layer (VCL) and non-VCL NAL units. The VCL NAL units contain the data that represents the values of the samples in the video pictures, and the non-VCL NAL units contain any associated additional information such as parameter sets (important data that can apply to a number of VCL NAL units) and supplemental enhancement information (timing information and other supplemental data that may enhance usability of the decoded video signal but are not necessary for decoding the values of the samples in the video pictures).

In an embodiment, the DCI 802 is contained in a non-VCL NAL unit designated as a DCI NAL unit or a DPS NAL unit. That is, the DCI NAL unit has a DCI NAL unit type (NUT) and the DPS NAL unit has a DPS NUT. In an embodiment, the VPS 804 is contained in a non-VCL NAL unit designated as a VPS NAL unit. Therefore, the VPS NAL unit has a VPS NUT. In an embodiment, the SPS 806 is a non-VCL NAL unit designated as a SPS NAL unit. Therefore, the SPS NAL unit has an SPS NUT. In an embodiment, the PPS 808 is contained in a non-VCL NAL unit designated as a PPS NAL unit. Therefore, the PPS NAL unit has a PPS NUT.

The PH 812 is a syntax structure containing syntax elements that apply to all slices (e.g., slices 818) of a coded picture (e.g., picture 814). In an embodiment, the PH 812 is in a new type of non-VCL NAL unit designated a PH NAL unit. Therefore, the PH NAL unit has a PH NUT (e.g., PH NUT). In an embodiment, there is one and only one PH 812 included in each PU 801. That is, the PU 801 contains a single or lone PH 812. In an embodiment, exactly one PH NAL unit is present for each picture 801 in the bitstream 800.

In an embodiment, the PH NAL unit associated with the PH 812 has a temporal ID and a layer ID. The temporal ID identifier indicates the position of the PH NAL unit, in time, relative to the other PH NAL units in the bitstream (e.g., bitstream 801). The layer ID indicates the layer (e.g., layer 531 or layer 532) that contains the PH NAL unit. In an embodiment, the temporal ID is similar to, but different from, the POC. The POC uniquely identifies each picture in order. In a single layer bitstream, temporal ID and POC would be the same. In a multi-layer bitstream (e.g., see FIG. 5), pictures in the same AU would have different POCs, but the same temporal ID.

In an embodiment, the PH NAL unit precedes the VCL NAL unit containing the first slice 818 of the associated picture 814. This establishes the association between the PH 812 and the slices 818 of the picture 814 associated with the PH 812 without the need to have a picture header ID signaled in the PH 812 and referred to from the slice header 820. Consequently, it can be inferred that all VCL NAL units between two PHs 812 belong to the same picture 814 and that the picture 814 is associated with the first PH 812 between the two PHs 812. In an embodiment, the first VCL NAL unit that follows a PH 812 contains the first slice 818 of the picture 814 associated with the PH 812.

In an embodiment, the PH NAL unit follows picture level parameter sets (e.g., the PPS) or higher level parameter sets such as the DCI (a.k.a., the DPS), the VPS, the SPS, the PPS, etc. having both a temporal ID and a layer ID less than the temporal ID and layer ID of the PH NAL unit, respectively. Consequently, those parameter sets are not repeated within a picture or an access unit. Because of this ordering, the PH 812 can be resolved immediately. That is, parameter sets that contain parameters relevant to an entire picture are positioned in the bitstream before the PH NAL unit. Anything that contains parameters for part of a picture is positioned after the PH NAL unit.

In one alternative, the PH NAL unit follows picture level parameter sets and prefix supplemental enhancement information (SEI) messages, or higher level parameter sets such as the DCI (a.k.a., the DPS), the VPS, the SPS, the PPS, the APS, the SEI message, etc.

The picture 814 is an array of luma samples in monochrome format or an array of luma samples and two corresponding arrays of chroma samples in 4:2:0, 4:2:2, and 4:4:4 colour format. In an embodiment, there is one and only one picture 814 included in each PU 801. As such, there is only one PH 812 and only one picture 814 corresponding to that PH 812 in each PU 801. That is, the PU 801 contains a single or lone picture 814.

The picture 814 may be either a frame or a field. However, in one CVS 816, either all pictures 814 are frames or all pictures 814 are fields. The CVS 816 is a coded video sequence for every coded layer video sequence (CLVS) in the video bitstream 800. Notably, the CVS 816 and the CLVS are the same when the video bitstream 800 includes a single layer. The CVS 816 and the CLVS are only different when the video bitstream 800 includes multiple layers (e.g., as shown in FIGS. 5 and 6).

Each picture 814 contains one or more slices 818. A slice 818 is an integer number of complete tiles or an integer number of consecutive complete CTU rows within a tile of a picture (e.g., picture 814). Each slice 818 is exclusively contained in a single NAL unit (e.g., a VCL NAL unit). A tile (not shown) is a rectangular region of CTUs within a particular tile column and a particular tile row in a picture (e.g., picture 814). A CTU (not shown) is a CTB of luma samples, two corresponding CTBs of chroma samples of a picture that has three sample arrays, or a CTB of samples of a monochrome picture or a picture that is coded using three separate color planes and syntax structures used to code the samples. A CTB (not shown) is an N×N block of samples for some value of N such that the division of a component into CTBs is a partitioning. A block (not shown) is an M×N (M-column by N-row) array of samples (e.g., pixels), or an M×N array of transform coefficients.

In an embodiment, each slice 818 contains a slice header 820. A slice header 820 is the part of the coded slice 818 containing the data elements pertaining to all tiles or CTU rows within a tile represented in the slice 818. That is, the slice header 820 contains information about the slice 818 such as, for example, the slice type, which of the reference pictures will be used, and so on.

The pictures 814 and their slices 818 comprise data associated with the images or video being encoded or decoded. Thus, the pictures 814 and their slices 818 may be simply referred to as the payload or data being carried in the bitstream 800.

Those skilled in the art will appreciate that the bitstream 800 may contain other parameters and information in practical applications.

Figure 9:
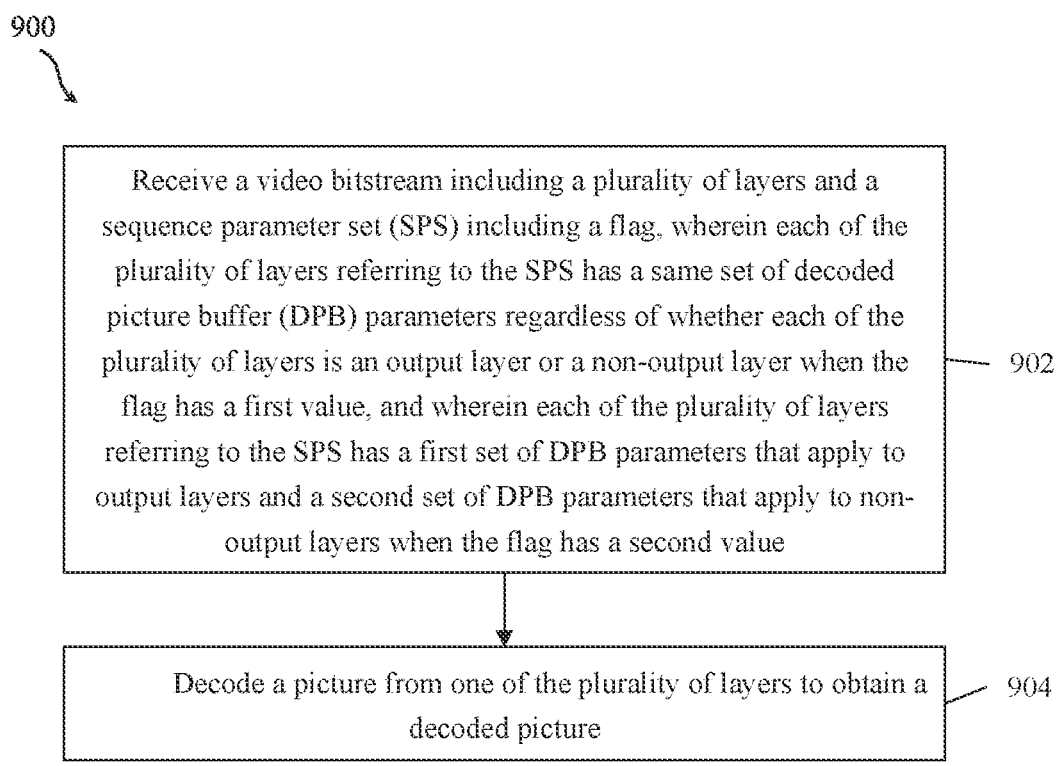
FIG. 9 is an embodiment of a method of decoding a coded video bitstream.

FIG. 9 is an embodiment of a method 900 of decoding implemented by a video decoder (e.g., video decoder 400). The method 900 may be performed after a bitstream has been directly or indirectly received from a video encoder (e.g., video encoder 300). The method 900 improves the decoding process by utilizing a flag to specify whether each of the plurality of layers or sublayers referring to a sequence parameter set (SPS) has a same set of decoded picture buffer (DPB) parameters regardless of whether each of the plurality of layers or sublayers is an output layer or a non-output layer or whether each of the plurality of layers or sublayers referring to the SPS has one set of DPB parameters that apply to output layers and another set of DPB parameters that apply to non-output layers. By using the flag, the same DPB parameters are not repeatedly signaled for the same layer or sublayer in some circumstances, which reduces redundancy and increases coding efficiency for multi-layer video bitstreams. Thus, the coder/decoder (a.k.a., "codec") in video coding is improved relative to current codecs. As a practical matter, the improved video coding process offers the user a better user experience when videos are sent, received, and/or viewed.

In block 902, the video decoder receives a video bitstream. The video bitstream includes a plurality of layers (e.g., layers 631-635) and a sequence parameter set (e.g., SPS 806) including a flag (e.g., flag 850). When the flag has a first value (e.g., one), each of the plurality of layers referring to the SPS has a same set of DPB parameters regardless of whether each of the plurality of layers is an output layer or a non-output layer. When the flag has a second value (e.g., zero), each of the plurality of layers referring to the SPS has a first set of DPB parameters that apply to output layers and a second set of DPB parameters that apply to non-output layers when the flag has a second value.

In block 904, the video decoder decodes a picture from one of the plurality of layers to obtain a decoded picture.

In an embodiment, the method 900 further comprises selecting the output layer from the plurality of layers prior to the decoding. In an embodiment, the method 900 further comprises selecting the picture from the output layer after the output layer has been selected.

In an embodiment, the DPB parameters comprise one or more DPB levels and one or more DPB sizes. In an embodiment, a second DPB size is inferred from a first DPB size included in the DPB size parameters.

In an embodiment, the DPB parameters include a picture reorder number. In an embodiment, the DPB parameters include latency information. In an embodiment, one of the one or more layers from the plurality of layers comprises one or more sublayers (e.g., sublayers 710, 720, 730).

Once the picture has been decoded, the picture may be used to generate or produce an image or video sequence for display to a user on the display or screen of an electronic device (e.g., a smart phone, tablet, laptop, personal computer, etc.).

Figure 10:
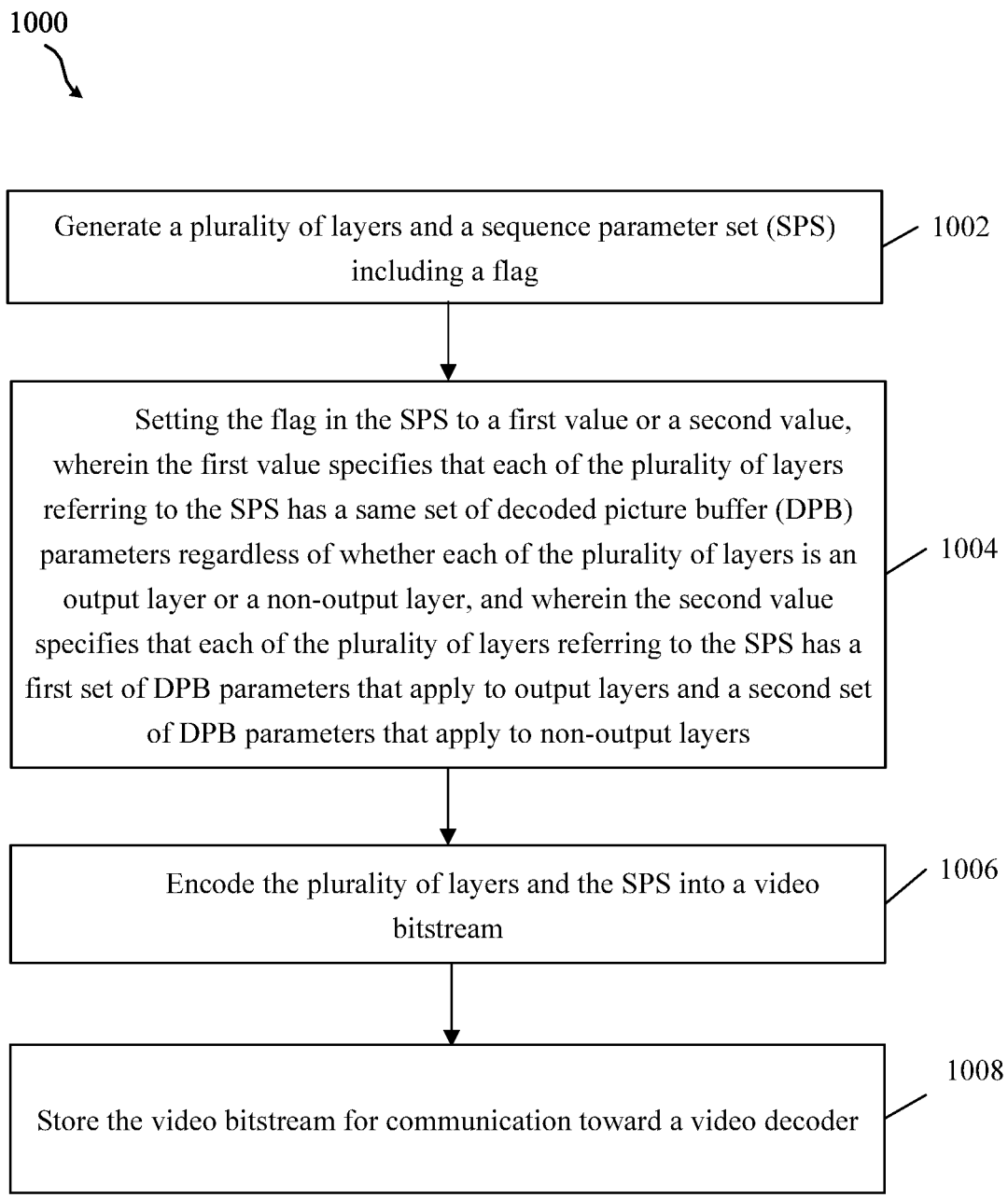
FIG. 10 is an embodiment of a method of encoding a coded video bitstream.

FIG. 10 is an embodiment of a method 1000 of encoding a video bitstream implemented by a video encoder (e.g., video encoder 300). The method 900 may be performed when a picture (e.g., from a video) is to be encoded into a video bitstream and then transmitted toward a video decoder (e.g., video decoder 400). The method 900 improves the encoding process by by utilizing a flag to specify whether each of the plurality of layers or sublayers referring to a sequence parameter set (SPS) has a same set of (DPB) parameters regardless of whether each of the plurality of layers or sublayers is an output layer or a non-output layer or whether each of the plurality of layers or sublayers referring to the SPS has one set of DPB parameters that apply to output layers and another set of DPB parameters that apply to non-output layers. By using the flag, the same DPB parameters are not repeatedly signaled for the same layer or sublayer in some circumstances, which reduces redundancy and increases coding efficiency for multi-layer video bitstreams. Thus, the coder/decoder (a.k.a., "codec") in video coding is improved relative to current codecs. As a practical matter, the improved video coding process offers the user a better user experience when videos are sent, received, and/or viewed.

In block 1002, the video encoder generates a plurality of layers (e.g., layers 631-635) and a sequence a plurality of layers (e.g., layers 631-635) and a sequence parameter set (e.g., SPS 806) including a flag (e.g., flag 850).

In block 1004, the flag is set to a first value (e.g., one) or a second value (e.g., zero). The first value specifies that each of the plurality of layers referring to the SPS has a same set of DPB parameters regardless of whether each of the plurality of layers is an output layer or a non-output layer. The second value specifies that each of the plurality of layers referring to the SPS has a first set of DPB parameters that apply to output layers and a second set of DPB parameters that apply to non-output layers.

In an embodiment, the DPB parameters comprise one or more DPB levels and one or more DPB sizes. In an embodiment, the DPB parameters include only a single DPB size. In an embodiment, the DPB parameters include one or more of a picture reorder number and latency information. In an embodiment, one or more of the plurality of layers comprises one or more sublayers.

In block 1006, the video encoder encodes the plurality of layers and the SPS into a video bitstream. In block 1008, the video encoder stores the video bitstream for communication toward a video decoder. The video bitstream may be stored in memory until the video bitstream is transmitted toward the video decoder. Once received by the video decoder, the encoded video bitstream may be decoded (e.g., as described above) to generate or produce an image or video sequence for display to a user on the display or screen of an electronic device (e.g., a smart phone, tablet, laptop, personal computer, etc.).

Figure 11:
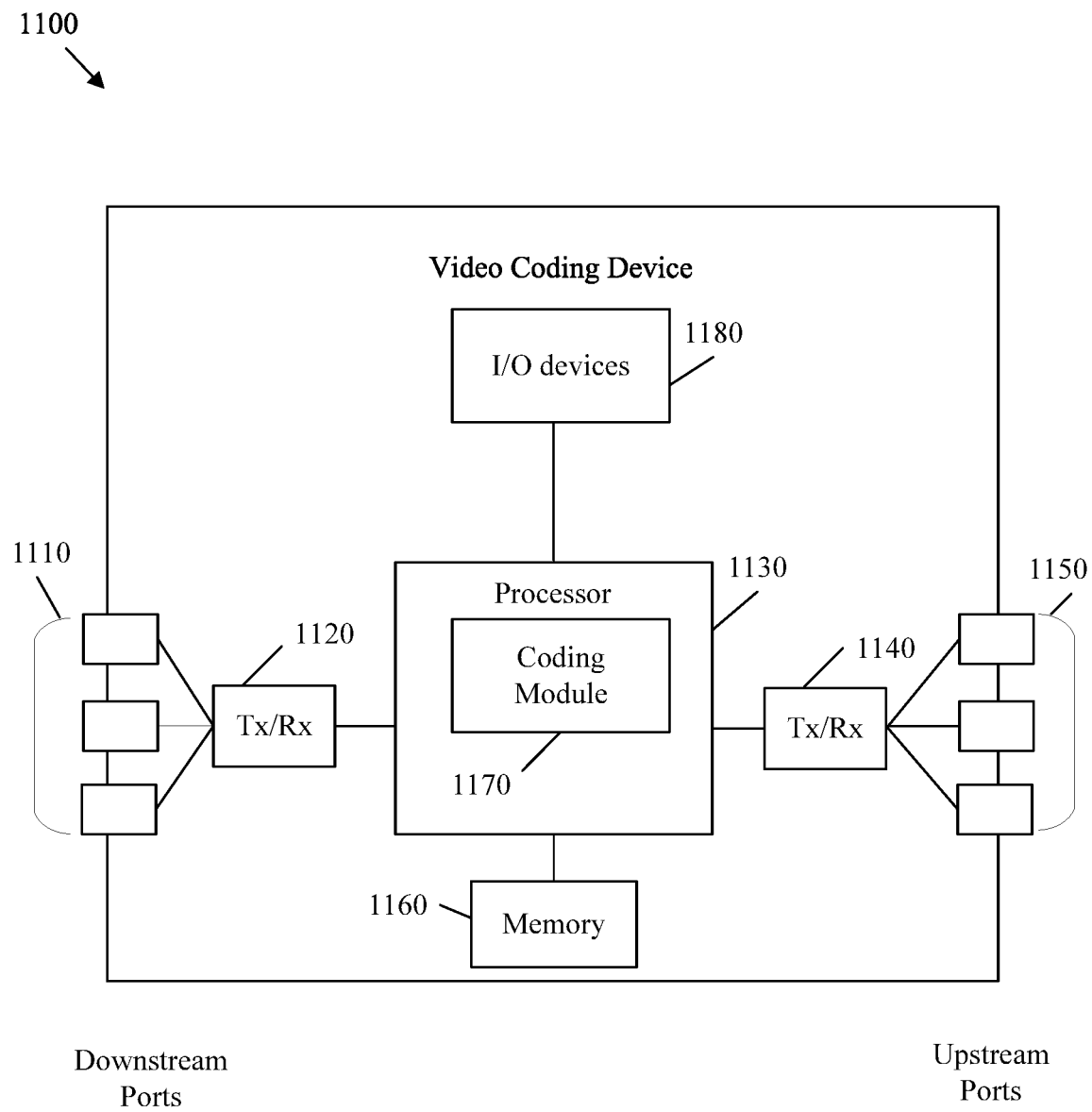
FIG. 11 is a schematic diagram of a video coding device.

FIG. 11 is a schematic diagram of a video coding device 1100 (e.g., a video encoder 300 or a video decoder 400) according to an embodiment of the disclosure. The video coding device 1100 is suitable for implementing the disclosed embodiments as described herein. The video coding device 1100 comprises ingress ports 1110 and receiver units (Rx) 1120 for receiving data; a processor, logic unit, or central processing unit (CPU) 1130 to process the data; transmitter units (Tx) 1140 and egress ports 1150 for transmitting the data; and a memory 1160 for storing the data. The video coding device 1100 may also comprise optical-to-electrical (OE) components and electrical-to-optical (EO) components coupled to the ingress ports 1110, the receiver units 1120, the transmitter units 1140, and the egress ports 1150 for egress or ingress of optical or electrical signals.

The processor 1130 is implemented by hardware and software. The processor 1130 may be implemented as one or more CPU chips, cores (e.g., as a multi-core processor), field-programmable gate arrays (FPGAs), application specific integrated circuits (ASICs), and digital signal processors (DSPs). The processor 1130 is in communication with the ingress ports 1110, receiver units 1120, transmitter units 1140, egress ports 1150, and memory 1160. The processor 1130 comprises a coding module 1170. The coding module 1170 implements the disclosed embodiments described above. For instance, the coding module 1170 implements, processes, prepares, or provides the various codec functions. The inclusion of the coding module 1170 therefore provides a substantial improvement to the functionality of the video coding device 1100 and effects a transformation of the video coding device 1100 to a different state. Alternatively, the coding module 1170 is implemented as instructions stored in the memory 1160 and executed by the processor 1130.

The video coding device 1100 may also include input and/or output (I/O) devices 1180 for communicating data to and from a user. The I/O devices 1180 may include output devices such as a display for displaying video data, speakers for outputting audio data, etc. The I/O devices 1180 may also include input devices, such as a keyboard, mouse, trackball, etc., and/or corresponding interfaces for interacting with such output devices.

The memory 1160 comprises one or more disks, tape drives, and solid-state drives and may be used as an over-flow data storage device, to store programs when such programs are selected for execution, and to store instructions and data that are read during program execution. The memory 1160 may be volatile and/or non-volatile and may be read-only memory (ROM), random access memory (RAM), ternary content-addressable memory (TCAM), and/or static random-access memory (SRAM).

Figure 12:
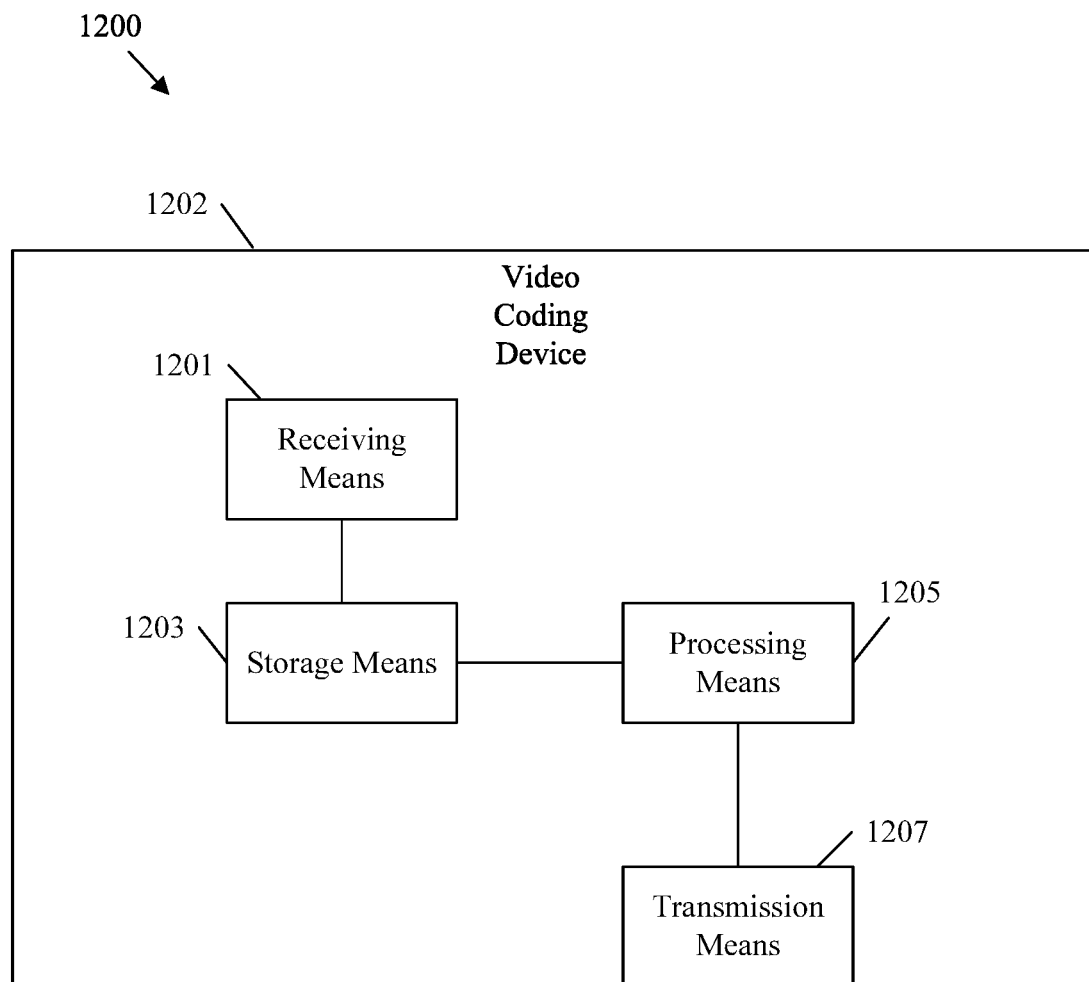
FIG. 12 is a schematic diagram of an embodiment of a means for coding.

FIG. 12 is a schematic diagram of an embodiment of a means for coding 1200. In an embodiment, the means for coding 1200 is implemented in a video coding device 1202 (e.g., a video encoder 300 or a video decoder 400). The video coding device 1202 includes receiving means 1201. The receiving means 1201 is configured to receive a picture to encode or to receive a bitstream to decode. The video coding device 1202 includes transmission means 1207 coupled to the receiving means 1201. The transmission means 1207 is configured to transmit the bitstream to a decoder or to transmit a decoded image to a display means (e.g., one of the I/O devices 1180).

The video coding device 1202 includes a storage means 1203. The storage means 1203 is coupled to at least one of the receiving means 1201 or the transmission means 1207. The storage means 1203 is configured to store instructions. The video coding device 1202 also includes processing means 1205. The processing means 1205 is coupled to the storage means 1203. The processing means 1205 is configured to execute the instructions stored in the storage means 1203 to perform the methods disclosed herein.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of decoding implemented by a video decoder, comprising:
receiving a video bitstream including a plurality of layers and a sequence parameter set (SPS) including a flag, wherein each of the plurality of layers referring to the SPS has a same set of decoded picture buffer (DPB) parameters regardless of whether each of the plurality of layers is an output layer or a non-output layer when the flag has a first value, and wherein each of the plurality of layers referring to the SPS has a first set of DPB parameters that apply to output layers and a second set of DPB parameters that apply to non-output layers when the flag has a second value; and
decoding a picture from one of the plurality of layers to obtain a decoded picture.

2. The method of claim 1, further comprising using the same set of DPB parameters to allocate memory for use in the decoding when the flag has the first value.

3. The method of claim 1, further comprising using the first set of DPB parameters to allocate memory for use in the decoding when the flag has the second value and the layers are output layers, and using the second set of DPB parameters to allocate memory for use in the decoding when the flag has the second value and the layers are non-output layers.

4. The method of claim 1, further comprising selecting the output layer from the plurality of layers prior to the decoding, and selecting the picture from the output layer after the output layer has been selected.

5. The method of claim 1, further comprising inferring a second DPB size from a first DPB size included in the DPB parameters.

6. The method of claim 1, wherein the DPB parameters include a picture reorder number and latency information.

7. The method of claim 1, wherein each of the plurality of layers referring to the SPS has a same level information regardless of whether each of the plurality of layers is the output layer or the non-output layer when the flag has a first value.

8. The method of claim 1, wherein one or more of the plurality of layers comprises one or more sublayers.

9. The method of claim 1, further comprising displaying the decoded picture on a display of an electronic device.

10. A method of encoding implemented by a video encoder, the method comprising:
generating a plurality of layers and a sequence parameter set (SPS) including a flag;
setting the flag in the SPS to a first value or a second value, wherein the first value specifies that each of the plurality of layers referring to the SPS has a same set of decoded picture buffer (DPB) parameters regardless of whether each of the plurality of layers is an output layer or a non-output layer, and wherein the second value specifies that each of the plurality of layers referring to the SPS has a first set of DPB parameters that apply to output layers and a second set of DPB parameters that apply to non-output layers;
encoding the plurality of layers and the SPS into a video bitstream; and
storing the video bitstream for communication toward a video decoder.

11. The method of claim 10, wherein the DPB parameters comprise one or more DPB sizes.

12. The method of claim 10, wherein the DPB parameters include only a single DPB size.

13. The method of claim 10, wherein the DPB parameters includes one or more of a picture reorder number and latency information.

14. The method of claim 10, wherein one or more of the plurality of layers comprises one or more sublayers.

15. A decoding device, comprising:
a receiver configured to receive a video bitstream including a plurality of layers and a sequence parameter set (SPS) including a flag, wherein each of the plurality of layers referring to the SPS has a same set of decoded picture buffer (DPB) parameters regardless of whether each of the plurality of layers is an output layer or a non-output layer when the flag has a first value, and wherein each of the plurality of layers referring to the SPS has a first set of DPB parameters that apply to output layers and a second set of DPB parameters that apply to non-output layers when the flag has a second value;
a memory coupled to the receiver, the memory storing instructions; and
a processor coupled to the memory, the processor configured to execute the instructions to cause the decoding device to decode a picture from one of the plurality of layers to obtain a decoded picture.

16. The decoding device of claim 15, wherein the processor is further configured to:
select an output layer from one of the plurality of layers prior to the decoding; and
select the picture from the output layer after the output layer has been selected.

17. The decoding device of claim 15, wherein the DPB parameters comprise one or more DPB levels and one or more DPB sizes.

18. The decoding device of claim 15, wherein the processor is configured to infer a second DPB size from a first DPB size included in the DPB parameters.

19. The decoding device of claim 18, wherein the DPB parameters include a picture reorder number.

20. The decoding device of claim 15, wherein the DPB parameters include latency information.

21. The decoding device of claim 15, wherein one or more of the plurality of layers comprises one or more sublayers.

22. The decoding device of claim 15, further comprising a display configured to display the decoded picture.

23. An encoding device, comprising:
a memory containing instructions;
a processor coupled to the memory, the processor configured to implement the instructions to cause the encoding device to:
generate a plurality of layers and a sequence parameter set (SPS) including a flag;
set the flag in the SPS to a first value when each of the plurality of layers referring to the SPS has a same set of decoded picture buffer (DPB) parameters regardless of whether each of the plurality of layers is an output layer or a non-output layer;
set the flag in the SPS to a second value when each of the plurality of layers referring to the SPS has a first set of DPB parameters that apply to output layers and a second set of DPB parameters that apply to non-output layers; and
encode the plurality of layers and the SPS into a video bitstream; and
a transmitter coupled to the processor, the transmitter configured to transmit the video bitstream toward a video decoder.

24. The encoding device of claim 23, wherein the processor is further configured to cause the encoding device to designate one of the plurality of layers as an output layer and designate another of the plurality of layers as a non-output layer.

25. The encoding device of claim 23, wherein the DPB parameters comprise one or more DPB levels and one or more DPB sizes.

26. The encoding device of claim 23, wherein the DPB parameters include only a single DPB size.

27. The encoding device of claim 23, wherein one or more of the plurality of layers comprises one or more sublayers.

* * * * *